US006333846B1

(12) United States Patent
Hashizawa et al.

(10) Patent No.: US 6,333,846 B1
(45) Date of Patent: Dec. 25, 2001

(54) POWER SUPPLY SHUT-OFF APPARATUS

(75) Inventors: Shigemi Hashizawa; Hidehiko Kuboshima; Masayuki Karamatsu, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/558,108

(22) Filed: Apr. 25, 2000

(30) Foreign Application Priority Data

Apr. 27, 1999 (JP) ........................................... P11-120605

(51) Int. Cl.[7] ........................................... H02B 1/20

(52) U.S. Cl. ........................ 361/649; 337/198; 361/833

(58) Field of Search ................................ 337/198, 414; 361/600, 641–650, 679, 775, 807, 809, 833, 837

(56) References Cited

U.S. PATENT DOCUMENTS 5,144,530 * 9/1992 Cohen et al. ........................ 361/641
5,767,761 * 6/1998 Muramatsu et al. ................ 361/833
5,808,859 * 9/1998 Liang ................................. 361/642
5,898,566 * 4/1999 Noschese et al. .................. 361/642
5,923,515 * 7/1999 Eubanks et al. ................... 361/401

FOREIGN PATENT DOCUMENTS 31 17646 A1 2/1983 (DE) .
42 12 889 C2 11/1995 (DE) .
197 00 514 C2 3/2000 (DE) .
100 03 267 A1 8/2000 (DE) .
692 10 964 T2 10/1996 (EP) .
692 09 443 T2 11/1996 (EP) .

* cited by examiner

*Primary Examiner*—Gregory Thompson
(74) *Attorney, Agent, or Firm*—Finnegan, Henderson, Farabow, Garrett & Dunner, L.L.P.

(57) ABSTRACT

A power supply shut-off apparatus 10 includes a fuse-accommodating box 14, a power supply-side bus bar 15, a load-side bus bar 16, and a plug 18 for connecting a power supply and a load through a fuse 13. A mounting portion 17 is provided with an insulation wall 11, a terminal 16*a* of the power supply-side bus bar 16 is located on one surface side of the insulation wall 19, and a terminal 11 of the fuse 13 is located on the other surface side of the insulation wall 19. The plug 18 is formed of a plug housing 49 and a terminal member 50 having a U-shaped cross section, the terminal member 50 is mounted astride the insulation wall 19 for electrically connecting the terminals 11, 12 of the fuse 13 to either one of terminals 15*a*, 16*b* of the power supply-side bus bar 15 and the load-side bus bar 16. The insulation wall 19 is provided with wobble-suppressing means 20 for preventing each of the terminals 11, 12 from moving from a wall surface of the insulation wall 19 and preventing each of the terminals 11, 12 from wobbling.

10 Claims, 22 Drawing Sheets

POWER SUPPLY SHUT-OFF APPARATUS

BACKGROUND OF THE INVENTION

1. Field of the Invention

The present invention relates to a power supply shut-off apparatus disposed between a power supply and a load for connecting the power supply and the load through a fuse and for cutting the connection between the power supply and the fuse or the connection between the load and the fuse, and more particularly, to a power supply shut-off apparatus suitable to be mounted on the side of the power supply of an electric car for electrically cutting the connection between the power supply and the load.

2. Description of the Related Art

A knife type power source shut-off apparatus is mounted on a base such that an operation lever of the apparatus can turn around a fulcrum. A receiving terminal connected to the power supply is fixed to one side in the turning direction of the operation lever, and operation terminal is fixed to the operation lever. The operation terminal is connected to a load. The receiving terminal comprises a pair of resilient pieces, and the operation terminal is resiliently sandwiched between the pair of resilient pieces by inserting a plate-like operation terminal between the resilient pieces.

If the operation lever is turned from the right side position into a counterclockwise direction around the fulcrum, the operation terminal is inserted between the resilient pieces of the receiving terminal and resiliently sandwiched therebetween, thereby establishing electrical conduction. If the operation terminal is pulled out between the pair of resilient pieces by turning the operation lever in the clockwise direction from this state so that the operation terminal is separated from the receiving terminal, the electric conduction between the power supply and the load is shut off.

In the case of the knife type power source shut-off apparatus, the electric conduction between the power supply and the load can easily be shut off by turning the operation lever around the fulcrum.

However, if a position between the pair of resilient pieces of the receiving terminal is deviated from orbit of the turning movement of the operation lever, or if positions of the pair of resilient pieces of the receiving terminal are deviated, the operation terminal is deviated toward one of the resilient pieces when the operation terminal is inserted between the resilient pieces, deflection amount of the one resilient piece is increased, the operation terminal receives resilient force more than necessary from the one resilient piece. Therefore, when the operation terminal is inserted between the resilient pieces, excessive force is required.

Also when the operation lever is turned to pull out the operation terminal from between the resilient pieces from the state where the operation terminal is inserted between the resilient pieces, since one of the resilient pieces has greater resistance, excessive force is required.

Therefore, in the case of the knife switch type power supply shut-off apparatus, if the operation lever is deviated from orbit of the turning movement of the operation lever, there is a problem that inserting force and pulling-out force are increase and operability is deteriorated.

Further, if external forces are applied to the operation lever and the latter is turned, there is an adverse possibility that the receiving terminal and the operation terminal are unintentionally connected to each other, and there is a problem that reliably insulation can not be secured.

SUMMARY OF THE INVENTION

It is an object of the present invention to provide a power supply shut-off apparatus capable of sufficiently ensure the insulation state and having excellent operability.

To achieve the above object, according to a first aspect of the present invention, a power supply shut-off apparatus, comprises: a fuse having a pair of terminals, a fuse-accommodating box in which the fuse is accommodated, a power supply-side bus bar for connecting a power supply to either one of the terminals accommodated in the fuse-accommodating box, a load-side bus bar for connecting a load to the other terminal, and a plug which is mounted to a mounting portion of the fuse-accommodating box or separated from the mounting portion, thereby interrupting either one of connections between the one terminal and the power supply-side bus bar and between the other terminal and the load-side bus bar through the fuse, wherein the mounting portion is provided with an insulation wall, the terminal of the power supply-side bus bar or the terminal of the load-side bus bar is located on one surface side of the insulation wall, and a terminal of the fuse is located on the other surface side of the insulation wall, the plug is formed of a plug housing and a terminal member having a U-shaped cross section, the terminal member being assembled into the plug housing and mounted astride the insulation wall for electrically connecting the terminal of the fuse to either one of terminals of the power supply-side bus bar and the load-side bus bar, and the insulation wall is provided with wobble-suppressing means for preventing each of the terminals from moving from a wall surface of the insulation wall and preventing each of the terminals from wobbling.

In this power supply shut-off apparatus, when the power supply and the load is connected, the terminal of the fuse is electrically connected to the terminal of the load-side bus bar or the power supply-side bus bar by mounting the terminal member of the plug astride the insulation wall of the fuse-accommodating box. When the power supply and the load are disconnected, the terminal member is detached from the insulation wall by separating the plug housing from the mounting portion, and the conductive state between the terminal of the fuse and the terminal of the load-side bus bar or the power supply-side bus is released.

In this power supply shut-off apparatus, the terminal of the load-side bus bar or the power supply-side bus and the terminal of the fuse are prevented from moving by the wobble-suppressing means. Therefore, when the terminal member of the plug is mounted astride the insulation wall, the insertion force is not varied. When the terminal member is pulled out from the insulation wall, since the terminals of the bus bars and the terminal of the fuse do not wobble, the terminal member can easily be pulled out from the insulation wall. Therefore, excellent operability can be obtained.

Further, since the terminal of the load-side bus bar or the power supply-side and the terminal of the fuse are located such as to sandwich the insulation wall therebetween, a reliable insulating state can be obtained by this insulation wall. Further, since the terminal member assembled into the plug is mounted to the mounting portion, the terminal of the load-side bus bar or the power supply-side bus bar and the terminal of the fuse are not unintentionally connected, and the insulation state can be secured sufficiently.

According to a second aspect of the invention, the wobble-suppressing means is a groove formed in the insulation wall into which a side end of the terminal is fitted.

In this power supply shut-off apparatus, a side end of the terminal of the load-side bus bar is fitted to the groove formed in the insulation wall, and the side end of the terminal of the fuse is fitted to the groove, each of the terminals does not move with respect to the wall surface of the insulation wall, and the wobbling is prevented.

According to a third aspect of the invention, an insulation flange is formed on an end of the insulation wall on an insertion side of the terminal member.

In this power supply shut-off apparatus, since the insulation flange is provided between the terminal of the fuse and the terminal of the load-side bus bar or the power supply-side bus bar located on opposite sides of the insulation wall, the insulating distance between the terminals on opposite surface of the insulation wall is elongated, and a sufficient insulation state can be obtained.

According to a fourth aspect of the invention, an intermediate bus bar is provided between the other terminal of the fuse and the terminal of the load-side bus bar, one end of the intermediate bus bar is connected to the other terminal, and the other end of the intermediate bus bar is located on one surface of the insulation wall.

In this power supply shut-off apparatus, the other end of the intermediate bus bar is located on one surface of the insulation wall, and the terminal of the load-side bus bar is located on the other surface. The terminal member is mounted astride the insulation wall by mounting the plug to the mounting portion, and the other end of the intermediate bus bar and the terminal of the load-side bus bar are electrically connected.

In this case, even if the accommodating position of the fuse accommodated in the fuse-accommodating box is slightly deviated and the terminals of the fuse are deviated, such deviation is absorbed by the connected portion between the one end of the intermediate bus bar and the terminal of the fuse. Therefore, when the other end of the intermediate bus bar is positioned on the one surface side of the insulation wall, the positional deviation is not generated, and it can be positioned and fixed in a predetermined position.

According to a fifth aspect of the invention, the power supply-side bus bar and the power supply are connected, and the load-side bus bar and the load are connected through the power supply.

In this power supply shut-off apparatus, it is unnecessary to directly connect the power supply shut-off apparatus to the power supply. Therefore, the power supply shut-off apparatus can be disposed on an arbitrary location separated away from the power supply and the load.

According to a sixth aspect of the invention, an electric shock preventing wall is provided around the insulation wall.

In this power supply shut-off apparatus, when the plug is mounted to the mounting portion of the fuse-accommodating box, a hand grasping the plug does not come in contact with terminals of the opposite surfaces of the insulation wall by providing the insulation preventing wall around the insulation wall, and it is possible to reliably prevent the electric shock.

According to a seventh aspect of the invention, the plug is mounted to the mounting portion in a direction along a longitudinal direction of the fuse.

In this power supply shut-off apparatus, even when operation spaces can not be obtained in the surroundings in the widthwise direction of the fuse-accommodating box, the plug can be mounted to the mounting portion from the direction along the longitudinal direction of the fuse-accommodating box. With this arrangement, the flexibility of mounting place of the fuse-accommodating box is enhanced.

According to an eighth aspect of the invention, the plug is mounted to the mounting portion in a direction intersecting a longitudinal direction of the fuse.

In this power supply shut-off apparatus, even if operation spaces can not be obtained on opposite sides of the longitudinal direction of the fuse-accommodating box, the plug can be mounted to the mounting portion from the direction intersecting the longitudinal direction of the fuse. With this arrangement, the flexibility of mounting place of the fuse-accommodating box is enhanced.

According to a ninth aspect of the invention, the power supply-side bus bar includes a power supply-side terminal includes a power supply-side terminal which is directly connected a terminal on the side of the load, and the load-side bus bar includes a load-side terminal which is directly connected to a terminal on the side of the load.

In this power supply shut-off apparatus, the load can be directly connected to the power supply by directly connecting the power supply-side terminal of the power supply-side bus bar to the power supply-side terminal. The power supply can be directly connected to the load by directly connecting the load-side terminal of the load-side bus bar to the load-side terminal. Therefore, wiring operation is unnecessary, and parts for wiring operation are unnecessary.

According to a tenth aspect of the invention, an insulation cover for closing an opening of the fuse-accommodating box is provided.

In this power supply shut-off apparatus, the fuse accommodated in the fuse-accommodating box is shielded from outside by the cover which closes the opening of the fuse-accommodating box. As a result, the fuse can be protected from outside, the fuse and terminals thereof are protected against unintentional contact, and safety is enhanced.

DETAILED DESCRIPTION OF THE PREFERRED EMBODIMENT

Embodiments of a power supply shut-off apparatus according to the present invention will be explained below.

[First Embodiment]

Figure 1:
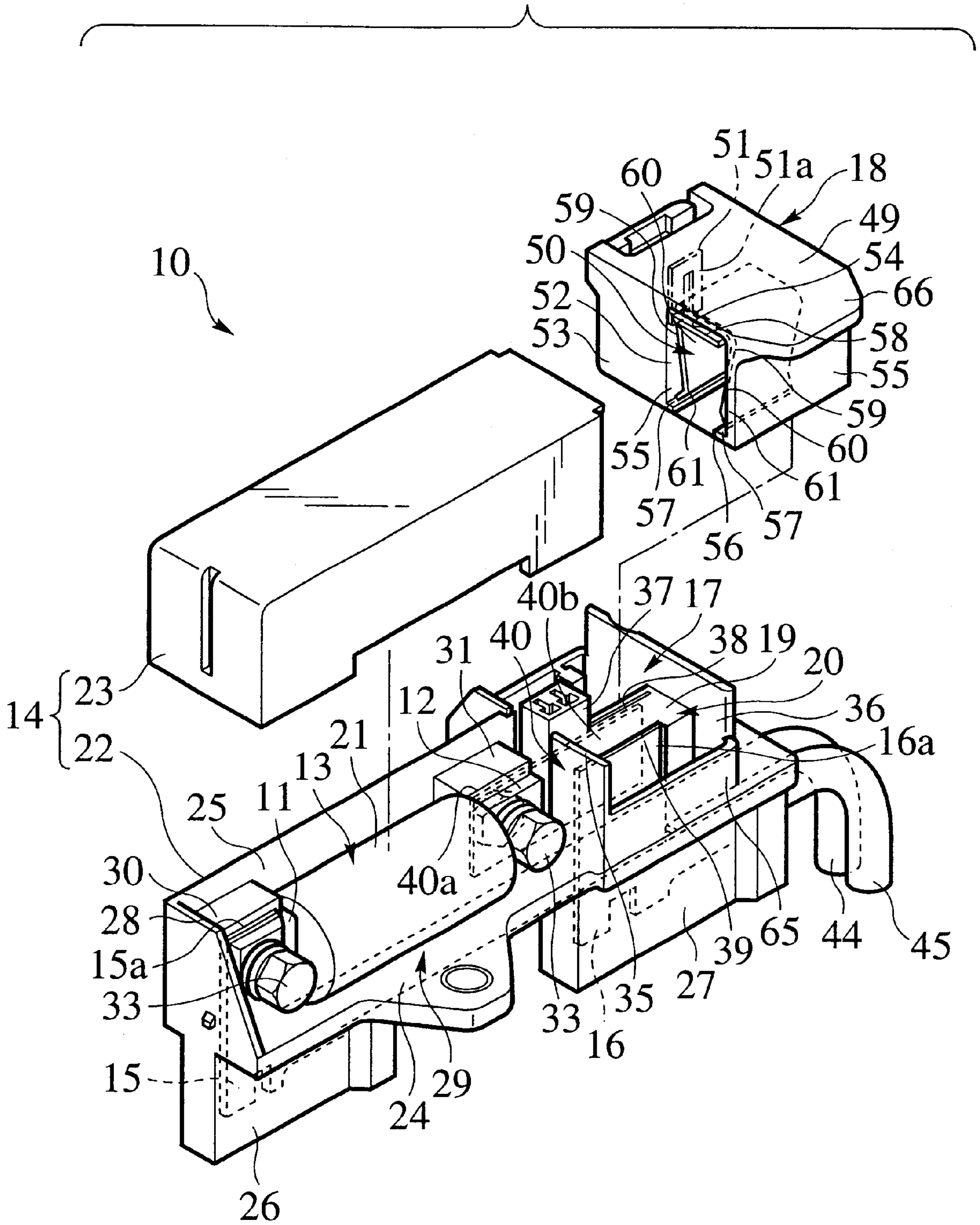
FIG. 1 is an exploded perspective view showing a power supply shut-off apparatus of a first embodiment.

A first embodiment will be explained using FIGS. 1 to 6. FIG. 1 is an exploded perspective view showing a power supply shut-off apparatus 10 of a first embodiment, FIG. 2A is a cross sectional view showing the assembled power supply shut-off apparatus, and FIG. 2B is a cross sectional view of the assembled power supply shut-off apparatus taken along the line IIB—IIB in FIG. 2A.

Figure 2B:
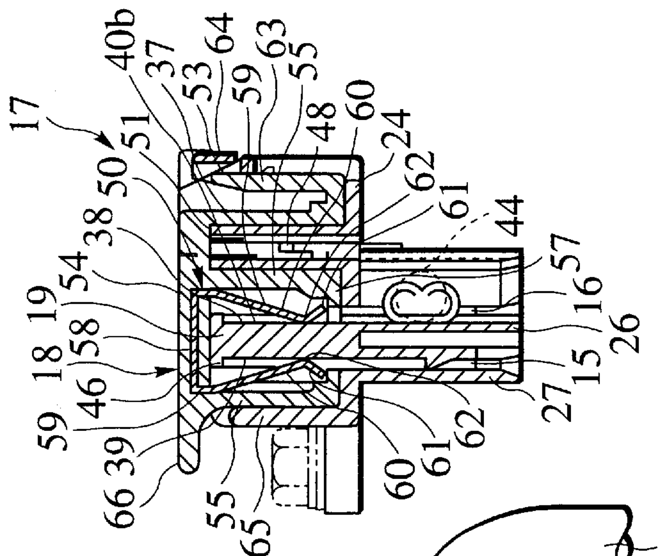
FIG. 2B is a cross sectional view of the assembled power supply shut-off apparatus taken along the line IIB—IIB in FIG. 2A.
Figure 2A:
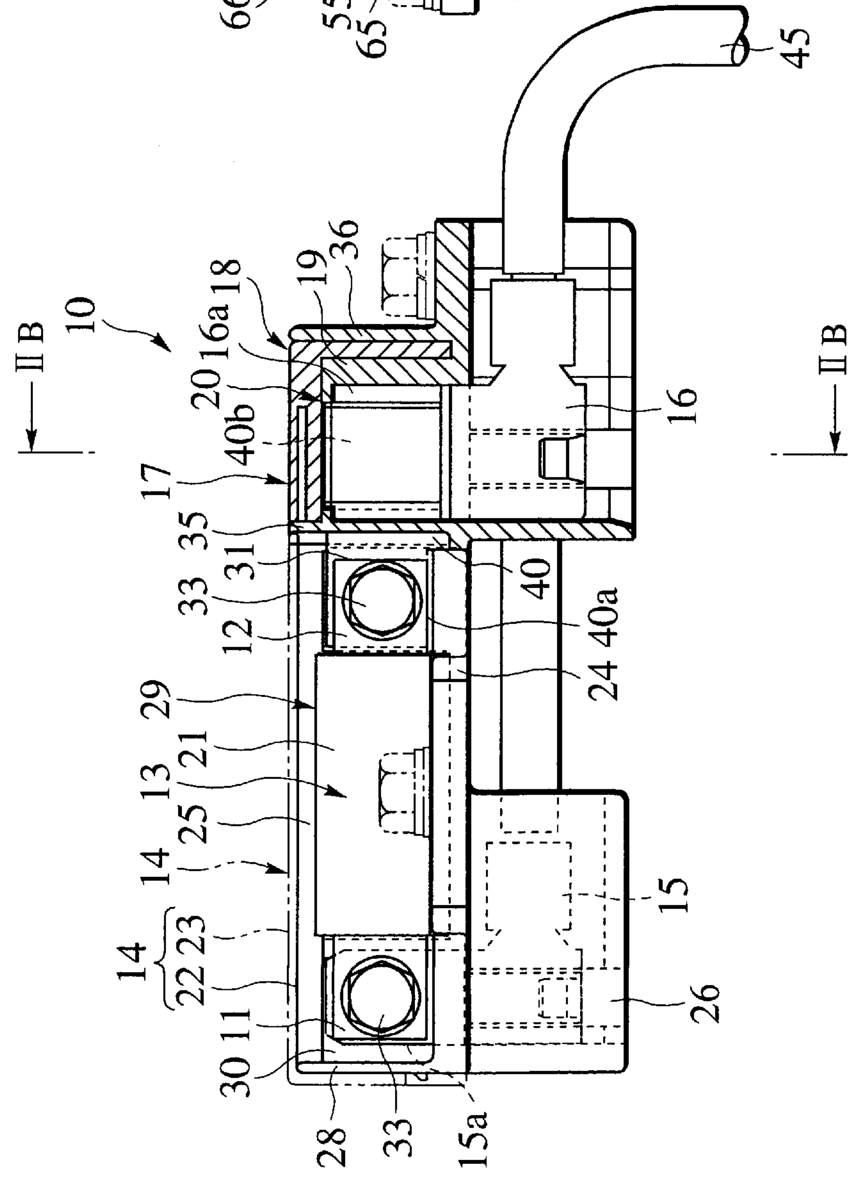
FIG. 2A is a cross sectional view showing the assembled power supply shut-off apparatus shown in FIG. 1.

As shown in FIGS. 1, 2A and 2B, the power supply shut-off apparatus 10 includes a fuse 13 having a pair of terminals 11 and 12, a fuse-accommodating box 14 for accommodating the fuse 13 therein, a power supply-side bus bar 15 for connecting the one of the terminal 11 of the fuse 13 accommodated in the fuse-accommodating box 14 and the power supply (not shown), a load-side bus bar 16 for connecting the other terminal 12 and a load (not shown), and a plug 18 which is mounted to a mounting portion 17 of the fuse-accommodating box 14 or detached from the mounting portion 17 for connecting and disconnecting the other terminal 12 and the load-side bus bar 16, thereby connecting and disconnecting the power supply and the load through the fuse 13.

The mounting portion 17 is provided with an insulation wall 19, and with wobble-suppressing means 20 for preventing terminals 40*b* and 16*a* disposed on opposite surfaces of the insulator 19 from wobbling.

The fuse 13 comprises a columnar fuse body 21, and the pair of plate-like terminals 11 and 12 project from opposite sides of the fuse body 21. Each of the terminals 11 and 12 is provided at its substantially central portion with a screw-fixing hole. The fuse 13 is accommodated in the fuse-accommodating box 14 and fixed by screws.

The fuse-accommodating box 14 is formed of an accommodating case 22 and a cover 23 for closing the accommodating case 22. The accommodating case 22 is formed of a base wall 24, a side wall 25 rising from one side of the base wall 24, and bus bar supporting walls 26 and 27 projecting from a lower surface of the base wall 24. The base wall 24 is formed at its longitudinally one side with a vertical wall 28 for connecting the base wall 24 and the side wall 25. An accommodating portion 29 in which the fuse 13 is accommodated is formed in a space surrounded by the vertical wall 28, the side wall 25 and the base wall 24.

In the accommodating portion 29, rectangular supporting blocks 30 and 31 project from the side wall 25 toward the base wall 24. The supporting blocks 30 and 31 are formed with screw holes 30*a* and 31*a* into which nuts 32 and 32 are embedded. The pair of terminals 11 and 12 of the fuse 13 accommodated in the accommodating portion 29 are located on front surface side of the supporting blocks 30 and 31. The fuse 13 is fixed to and held by the accommodating portion by inserting and threading the bolts 33 into the screw holes of the terminals 11 and 12.

A slit is formed in one of the bus bar supporting walls 26 on the side of the base wall 24, and a terminal 15*a* of the power supply-side bus bar 15 is inserted from the inside of the slit toward the front surface of the supporting block 30.

The one terminal 11 of the fuse 13 and the terminal 15*a* of the power supply-side bus bar 15 are together fixed to the supporting block 30 so that the one terminal 11 of the fuse 13 and the terminal 15*a* of the power supply-side bus bar 15 are electrically connected. The power supply-side bus bar 15 is swaged and connected to an electric wire 44 of the bus bar supporting wall 26 and is connected to the power supply.

The mounting portion 17 is formed outside the other supporting block 31. The mounting portion 17 is formed with an insulation wall 19 rising from the base 24, an electric shock preventing wall 35 provided between the insulation wall 19 and the supporting block 31, another electric shock preventing wall 36 provided on the other side from the electric shock preventing wall 35 with respect to the insulation wall 19, and a cover wall 65 for connecting one sides of both the electric shock preventing walls 35 and 36. A connector 37 rises from the base wall 24 substantially in parallel to the insulation wall 19 on the side of the side wall 25 of the insulation wall 19.

Terminal holding surfaces 38 and 39 are respectively formed on opposite surfaces of the insulation wall 19. The one side terminal 40*b* of an intermediate bus bar 40 is located on the one terminal holding surface 38, and the terminal 16*a* of the load-side bus bar 16 is located on the other end holding surface 39. The intermediate bus bar 40 passes through the electric shock preventing wall 35 and the other side terminal 40*a* is located on the side of the front surface of the supporting block 31. The other terminal 12 of the fuse 13 and the other side terminal 40*a* of the intermediate bus bar 40 are electrically connected to each other by fastening and fixing the intermediate bus bar 40 by the bolt 33 together with the other terminal 12 of the fuse 13.

On the other hand, a slit is formed in the base wall 24 on the side of the terminal holding surface 39. The terminal 16*a* of the load-side bus bar 16 supported by the bus bar supporting wall 27 is inserted from the slit, and the terminal 16*a* is located on the terminal holding surface 39. The load-side bus bar 16 is swaged and connected to the electric wire 45 to the side of the bus bar supporting wall 27 and connected to the load.

Figure 3:
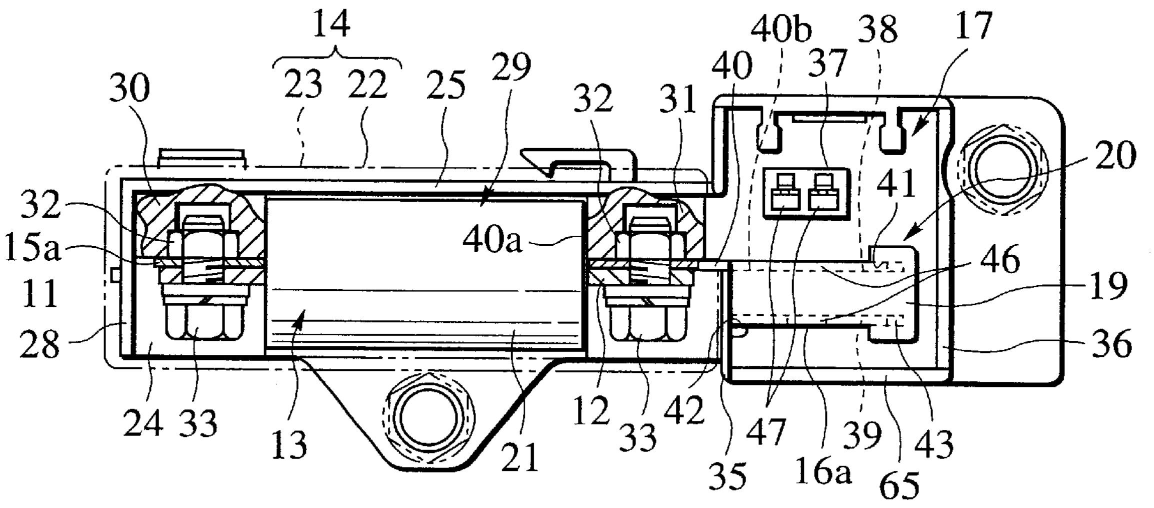
FIG. 3 is a partially cutaway plan view of a fuse-accommodation box of the power supply shut-off apparatus shown in FIG. 1.
Figures 4A, 4B:
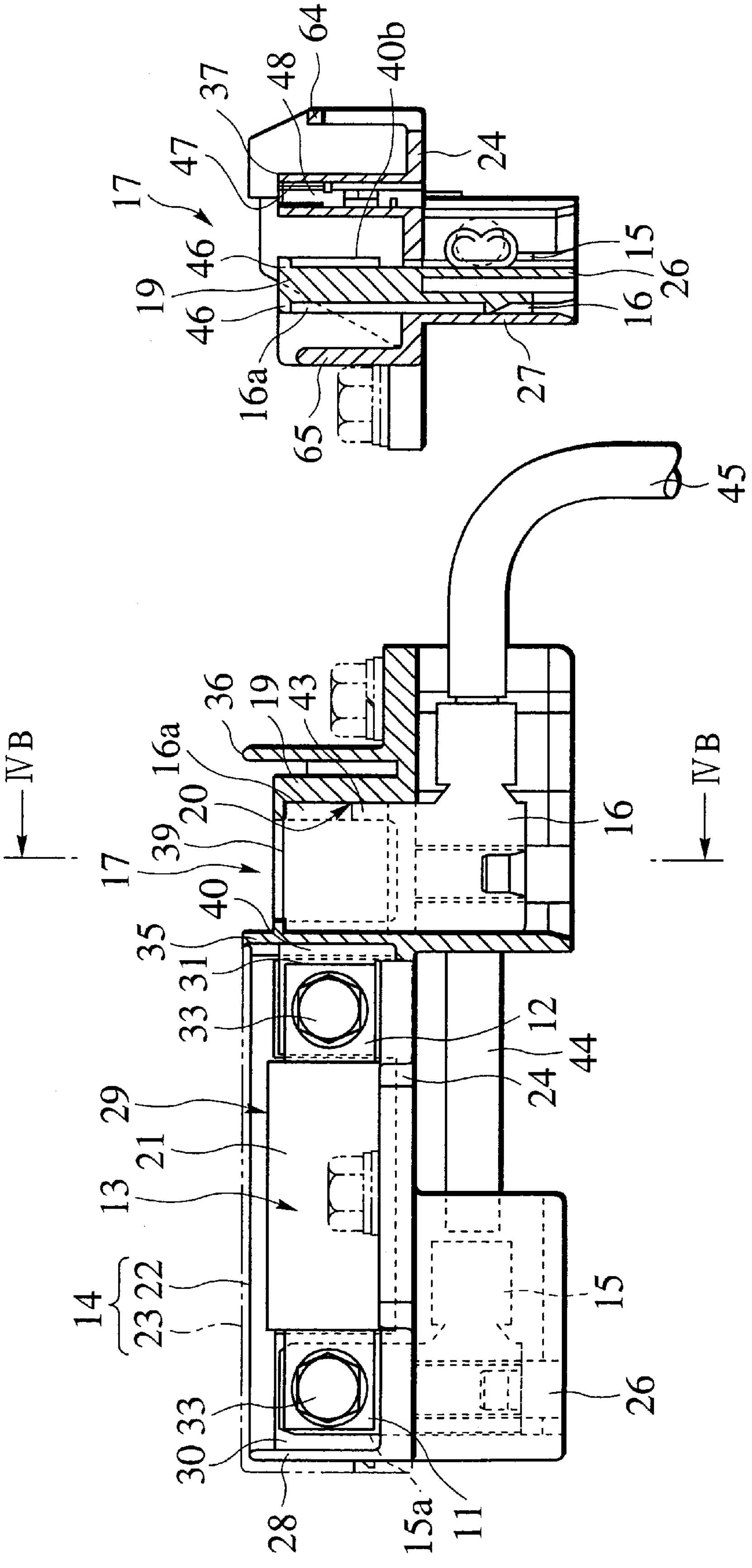
FIG. 4A is a partially cutaway side view of the fuse-accommodation box of the power supply shut-off apparatus shown in FIG. 1.
FIG. 4B is a cross sectional view of the fuse-accommodation box taken along the line IVB—IVB in FIG. 4A.

As shown in FIG. 3, a holding groove 41 to which a tip end of the intermediate bus bar 40 is formed in the insulation wall 19 on the side of the terminal holding surface 38. The holding groove 41 prevents the intermediate bus bar 40 from moving with respect to the terminal holding surface 38 by fitting the tip end of the intermediate bus bar 40 into the holding groove 41 to prevent the wobble. Further, holding grooves 42 and 43, into which opposite sides of the load-side bus bar 16 are fitted, are formed on the terminal holding surface 39. By fitting the opposite sides of the load-side bus bar 16 into the holding grooves 42 and 43, the wobble of the load-side bus bar 16 from the terminal holding surface 39 is prevented. The holding grooves 41 and 42 formed in the terminal holding surfaces 38 and 39 on the opposite surfaces of the insulation wall 19 constitute the wobble-suppressing means 20.

Insulation flanges 46, 46 equal to or slightly shorter than thickness of the intermediate bus bar 40 and the thickness of the load-side bus bar 16 are integrally formed on an upper surface of the insulation wall 19. By providing the insulation flanges 46, 46, the insulating length between the terminal 40*b* of the intermediate bus bar 40 and the terminal 16*a* of the load-side bus bar 16 is elongated.

Two terminal accommodating chambers 47, 47 are formed in the connector 37 rising substantially in parallel to the insulation wall 19. Female terminals 48, 48 are respectively accommodated in the terminal accommodating chambers 47, 47. The connector 37 is fitted to a hood 53 of the plug 18 mounted to the mounting portion 17, and a male terminal 51 projecting from the hood 53 is connected to the female terminal 48.

The plug 18 is formed of a plug housing 49, a terminal member 50 assembled into the plug housing 49 and the male terminal 51 connected to the female terminal 48 of the connector 37. A grasping plate 66, a fitting groove 52 formed in one side of a lower surface of the grasping plate 66, and a fitting hood 53 formed in the other side of the lower surface of the grasping plate 66 are integrally formed in the housing 49.

The fitting groove 52 is formed of a bottom wall 54 and a pair of side walls 55, 55. A mounting opening 56 is provided in a side opposed to the bottom wall 54. The fitting groove 52 is also opened in its longitudinal direction. The insulation wall 19 is inserted into the mounting opening 56. Stopping walls 57, 57 projecting in mutually approaching directions are provided on the pair of side walls on the side of the mounting opening 56. The stopping walls 57, 57 prevent the terminal member 50 assembled in the fitting groove 52 from loosing and falling out.

The terminal member 50 is formed into a U-shape by a base plate 58, and a pair of resilient contact plates 59, 59 bent from opposite sides of the base plate 58 in the same direction. The pair of resilient contact plates 59, 59 can be resiliently deformed with respect to the base plate 58. Each of the resilient contact plate 59 is formed into a mountain-shape by a resilient piece 60 which is bent inward, a stopping piece extending from the resilient piece 60 outward, and a contact top 62 between the resilient piece 60 and the stopping piece 61. The base plate 58 is integrally embedded in the plug housing 49. The stopping pieces 61, 61 abut against the stopping walls 57, 57.

A contact portion 51*a* of the male terminal 51 projects from the hood 53 provided adjacent to the fitting groove 52. The connector 37 of the mounting portion 17 is fitted in the hood 53 in a state where the plug 18 is mounted to the mounting portion 17, the female terminal 48 and the male terminal 51 of the connector 37 are connected to each other. With this arrangement, the plug 18 is mounted to the mounting portion 17, and it is detected that the load and the power supply are connected to each other.

A flexible locking arm 63 is provided outside the hood 53 in the plug 18. The locking arm 63 engages a locking frame 64 provided in the mounting portion 17 for preventing the plug 18 from loosing and falling out from the mounting portion 17.

Next, a procedure for connecting the plug 18 to the mounting portion 17 to connect the load and the power supply through the fuse 13, and a procedure for detaching the plug 18 from the mounting portion 17 to interrupt the connection between the load and the power supply will be explained.

As shown in FIG. 1, the fuse 13 is accommodated in the accommodating portion 29, and the one terminal 11 is fixed to the supporting block 30 by the bolt 33 together with the terminal 15*a* of the power supply-side bus bar 15. The other terminal 12 is fixed to the supporting block 31 by the bolt 33 together with the terminal 40*a* of the intermediate bus bar 40. In this state, the terminal 40*a* of the intermediate bus bar 40 is fixed to the one terminal holding surface 38 of the insulation wall 19. The terminal 16*a* of the load-side bus bar 16 is fixed to the other terminal holding surface 39. The terminal 40*b* of the intermediate bus bar 40 and the terminal 16*a* of the load-side bus bar 16 are prevented from moving from the terminal holding surfaces 38 and 39 by the holding grooves 41, 42 and 43 which are the wobble-suppressing means 20, and wobble of the terminals are prevented.

Figure 5B:
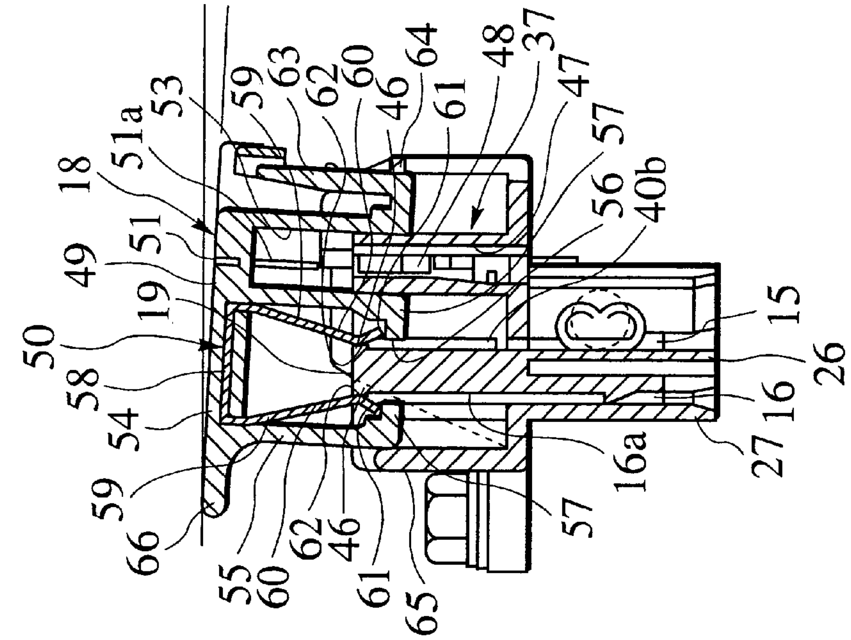
FIG. 5B is a cross sectional view showing a slanting fitting state when the plug shown in FIG. 5B is inserted into the mounting portion.
Figure 5A:
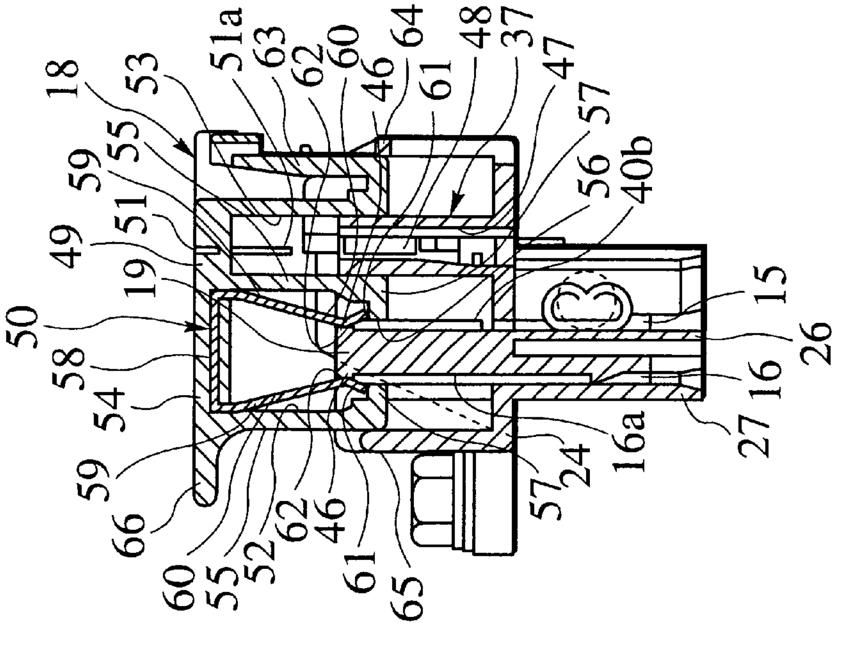
FIG. 5A is a cross sectional view showing a normal fitting state when a plug of the power supply shut-off apparatus shown in FIG. 1 is inserted into a mounting portion.

As shown in FIG. 5A, if the plug 18 is pushed into the mounting portion 17 in a state where the plug 18 is placed on the mounting portion 17, the resilient pieces 60, 60 of the terminal member 50 are deflected outward, and the contact tops 62, 62 come into contact with the terminal 40*a* of the intermediate bus bar 40 and the terminal 16*a* of the load-side bus bar 16. If the plug 18 is further pushed into the mounting portion 17, as shown in FIGS. 2A and 2B, the upper surface of the insulation wall 19 abuts against the bottom wall 54 of the fitting groove 52. With this, the load-side bus bar 16 and the intermediate bus bar 40 are electrically connected through the terminal member 50, the load-side bus bar 16 is electrically connected to the power supply-side bus bar 15, and the load and the power supply are connected.

As shown in FIG. 5B, when the plug 18 is pushed into the mounting portion 17, even if an attempt is made to fit the plug 18 into the mounting portion 17 obliquely, the outer peripheral surface of the plug 18 is guided by the cover wall 65, the inner wall of the hood 53 is guided by the outer peripheral surface of the connector 37, the fitting direction is corrected properly, and the plug 18 is fitted in a proper state as shown in FIGS. 2A and 2B.

Next, when the plug 18 is pulled out from the mounting portion 17 from the above state, the grasping plate 66 is grasped and pulled upward. If the plug 18 is pulled upward, the contact tops 62, 62 of the terminal member 50 slide on the terminal 40*a* of the intermediate bus bar 40 and the terminal 16*a* of the load-side bus bar 16, and the plug 18 is further pulled upward, the plug 18 comes off from the mounting portion 17. If the plug 18 comes off from the mounting portion 17, the terminal member 50 is separated from the terminals 40*b* and 16*a* and thus, the terminals 40*b* and 16*a* are electrically disconnected. With this, the load-side bus bar 16 and the terminal 12 of the fuse 13 are electrically disconnected.

In this state, the terminal 16*a* of the load-side bus bar 16 and the terminal 40*a* of the intermediate bus bar 40 are insulated by the insulation flanges 46, 46.

According to the present embodiment, the terminal 40*a* of the intermediate bus bar 40 and the terminal 16*a* of the load-side bus bar 16 located on opposite surfaces of the insulation wall 19 are prevented from moving by the holding grooves 41, 42 and 43 which are the wobble-suppressing means 20. Therefore, when the terminal member 50 is mounted astride the insulation wall 19, its insertion force will not be varied.

Further, when the terminal member 50 is pulled out from the insulation wall 19, since the intermediate bus bar 40 and the terminal 16*a* of the load-side bus bar 16 do not wobble, the terminal member 50 can easily be pulled out from the insulation wall 19. Therefore, excellent operability can be obtained.

Further, because the intermediate bus bar 40 and the terminal 16*a* of the load-side bus bar 16 are located such as to sandwich the insulation wall 19, a reliably insulating state can be obtained by this insulation wall 19.

Moreover, since the terminal member 50 assembled into the plug 18 is mounted to the mounting portion 17, the terminal 40*b* of the intermediate bus bar 40 and the terminal 16*a* of the load-side bus bar 16 are not unintentionally connected, and the insulation state can be secured sufficiently.

Since the power supply-side bus bar 15 and the power supply, as well as the load-side bus bar 16 and the load are connected through the wires 44 and 45, respectively, it is unnecessary to directly connect the power supply shut-off apparatus 10 to the power supply. Therefore, the power supply shut-off apparatus 10 can be disposed on an arbitrary location separated away from the power supply and the load.

Since the insertion direction of the plug 18 into the mounting portion 17 is intersecting a longitudinal direction of the fuse 13, even if operation spaces can not be obtained on opposite sides of the longitudinal direction of the fuse-accommodating box 14, the plug 18 can be mounted to the mounting portion 17 from the direction intersecting the longitudinal direction of the fuse 13. With this arrangement, the flexibility of mounting place of the fuse-accommodating box 14 is enhanced.

Further, the fuse 13 accommodated in the fuse-accommodating box 14 is shielded from outside by the insulation cover 23 which closes the opening of the fuse-accommodating box 14. As a result, the fuse 13 can be protected from outside, the fuse 13 and terminals 11 and 12 thereof are protected against unintentional contact, and safety is enhanced.

Figure 6A:
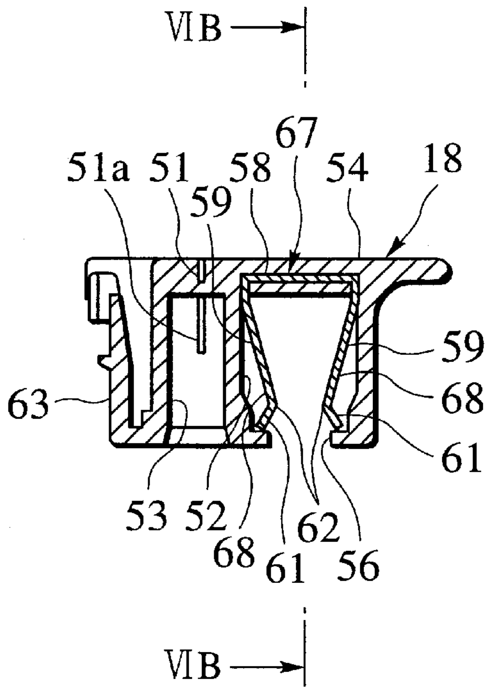
FIG. 6A is a cross sectional view showing a modification of a terminal member of the power supply shut-off apparatus shown in FIG. 1.
Figure 6B:
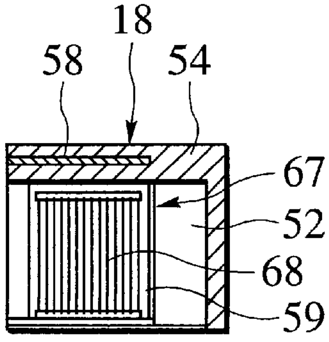
FIG. 6B is a cross sectional view of the terminal member taken along the line VIB—VIB in FIG. 6A.

FIGS. 6A and 6B show a modification of another terminal member 67. In this terminal member 67, a resilient piece 68 is formed such that it is divided into a plurality of pieces in the insertion direction of the mounting portion 17 like a comb.

According to this terminal member 67, when the plug 18 is mounted to the mounting portion 17, since the resilient piece 68 is divided into the plurality of pieces, repulsion force with respect to the deflection of each piece is reduced, and the insertion force can be reduced.

[Second Embodiment]

Figure 7:
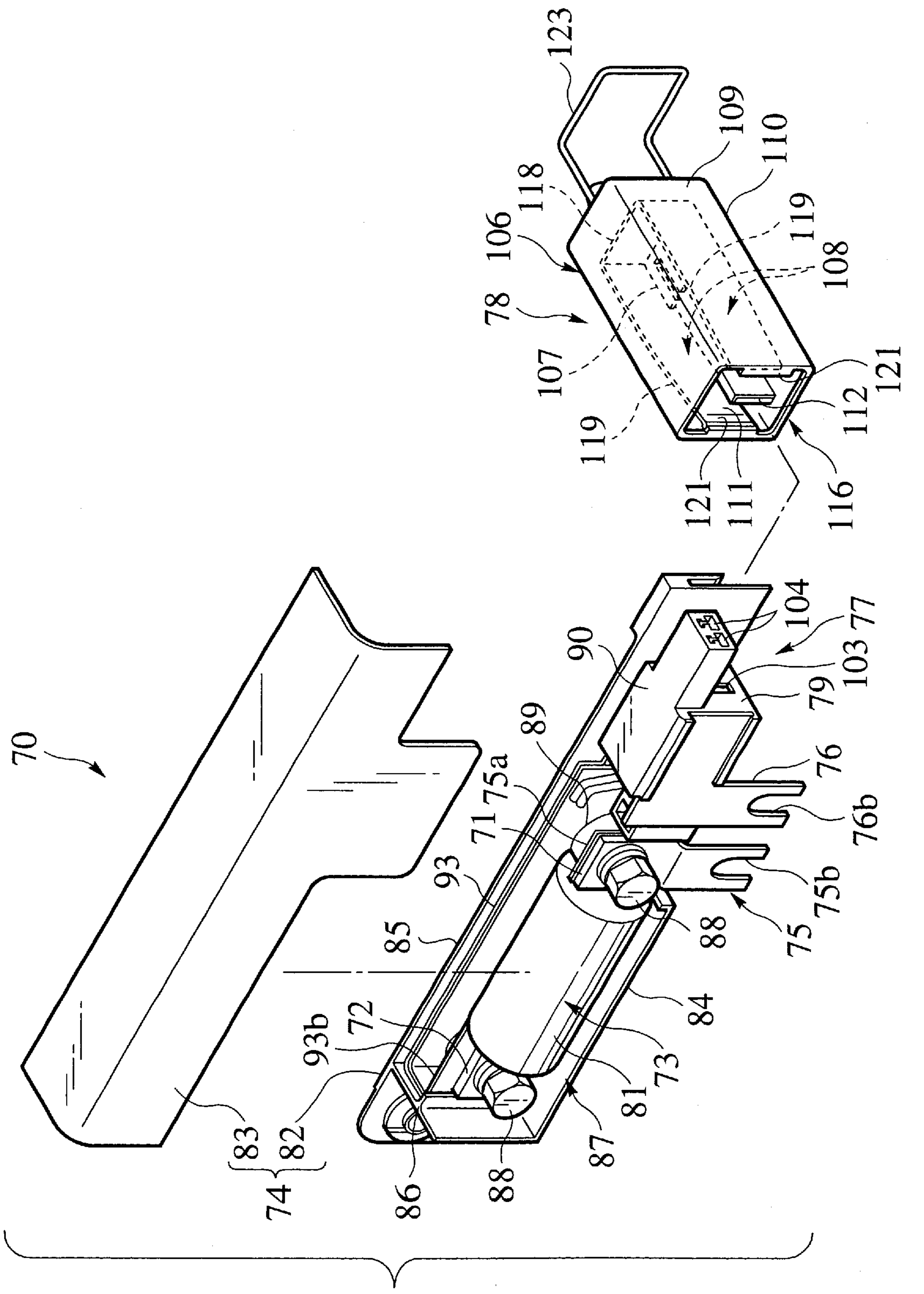
FIG. 7 is an exploded perspective view showing a power supply shut-off apparatus of a second embodiment.

A second embodiment will be explained with reference to FIGS. 7 to 12. FIG. 7 is an exploded perspective view showing a power supply shut-off apparatus 70 of the second embodiment, and FIG. 8 is a cross sectional view showing the assembled power supply shut-off apparatus 70.

Figure 8:
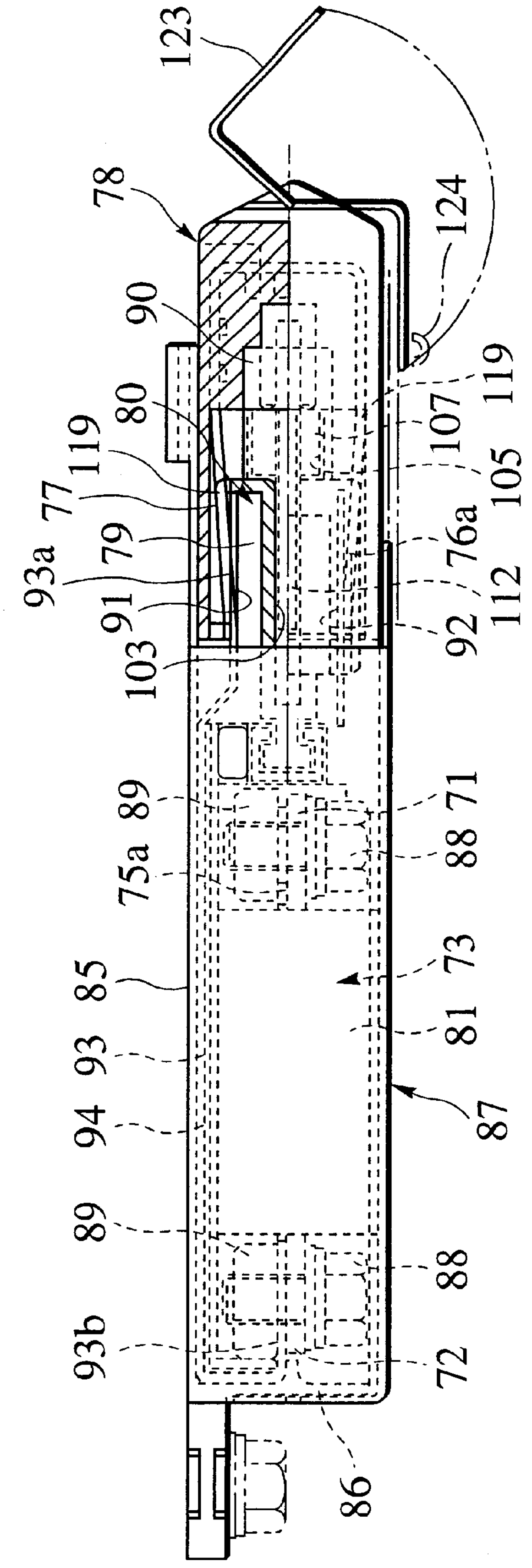
FIG. 8 is a cross sectional view showing the assembled power supply shut-off apparatus shown in FIG. 1.

As shown in FIGS. 7 and 8, the power supply shut-off apparatus 70 includes a fuse 73 having a pair of terminals 71 and 72, a fuse-accommodating box 74 for accommodating the fuse 73 therein, a power supply-side bus bar 75 for connecting the one of the terminal 71 of the fuse 73 accommodated in the fuse-accommodating box 74 and the power supply (not shown), a load-side bus bar 76 for connecting the other terminal 72 and a load (not shown), and a plug 78 which is mounted to a mounting portion 77 of the fuse-accommodating box 74 or detached from the mounting portion 77 for connecting and disconnecting the other terminal 72 and the load-side bus bar 76, thereby connecting and disconnecting the power supply and the load through the fuse 73.

The mounting portion 77 is provided with an insulation wall 79, and with wobble-suppressing means 80 for preventing terminals 76*a* and 93*a* disposed on opposite surfaces of the insulator 79 from wobbling.

The fuse 73 comprises a columnar fuse body 81, and the pair of plate-like terminals 71 and 72 project from opposite sides of the fuse body 81. Each of the terminals 71 and 72 is provided at its substantially central portion with a screw-fixing hole. The fuse 73 is accommodated in the fuse-accommodating box 74.

The fuse-accommodating box 74 is formed of an accommodating case 82 and an insulation cover 83 for closing an opening of the accommodating case 82. The accommodating case 82 is formed of a base wall 84, and a side wall 85 rising from one side of the base wall 84. The base wall 84 is formed at its longitudinally one side with a vertical wall 86 for connecting the base wall 84 and the side wall 85. An accommodating portion 87 in which the fuse 73 is accommodated is formed in a space surrounded by the vertical wall 86, the base wall 84 and the side wall 85.

By fastening and fixing the terminal 71 of the fuse 72 and the terminal 75*a* of the power supply-side bus bar 75 by means of bolts 88 and nuts 89, the one terminal 71 of the fuse 73 is electrically connected to the power supply-side bus bar 75. The power supply-side bus bar 75 includes a power supply-side terminal 75*b* which is directly connected to a power supply-side terminal (not shown).

The mounting portion 77 is formed outside the one terminal 71 of the fuse 73. The mounting portion 77 is formed with an insulation wall 79 rising from the base wall 84 and a connector 90 provided on an upper surface of the insulation wall 79.

Terminal holding surfaces 91 and 92 are respectively formed on opposite surfaces of the insulation wall 79. One side terminal 93*a* of an intermediate bus bar 93 is located on the one terminal holding surface 91, the intermediate bus bar 93 is located on the one terminal holding surface 91, and the terminal 76*a* of the load-side bus bar 76 is located on the other terminal holding surface 92. The load-side bus bar 76 includes a load-side terminal 76*b* which is directly connected to a load-side terminal (not shown). The intermediate bus bar 93 passes through between an electric shock preventing wall 94 and the side wall 85, and the other side terminal 93*b* is fastened to the other terminal 72 by the bolt 88 and the nut 89, and the other terminal 72 of the fuse 73 and the intermediate bus bar 93 are electrically connected.

Figure 9C:
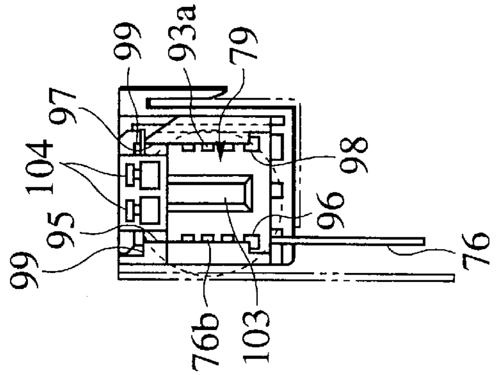
FIG. 9C is a cross sectional view of the fuse-accommodation box shown FIG. 9B taken along the line IXC—IXC.
Figure 9A:
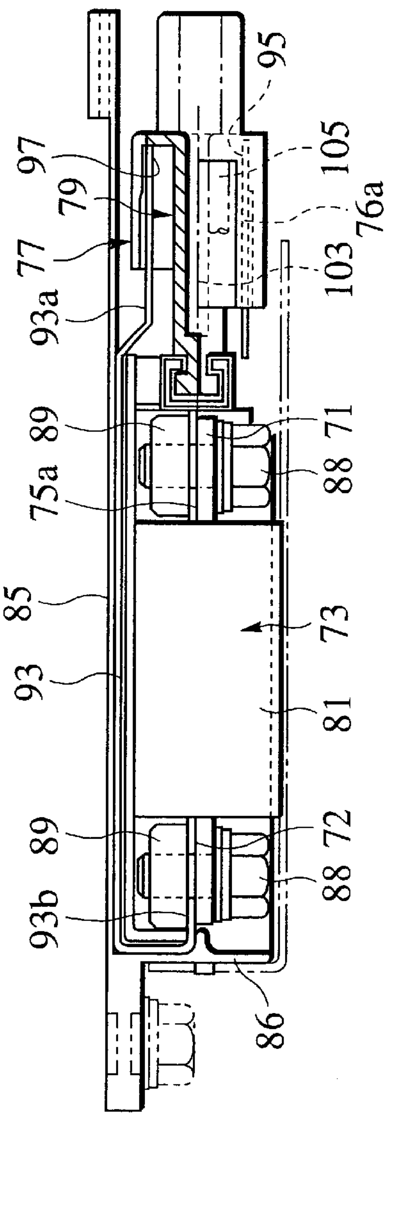
FIG. 9A is a plan view of a fuse-accommodation box of the power supply shut-off apparatus shown in FIG. 7.
Figure 9B:
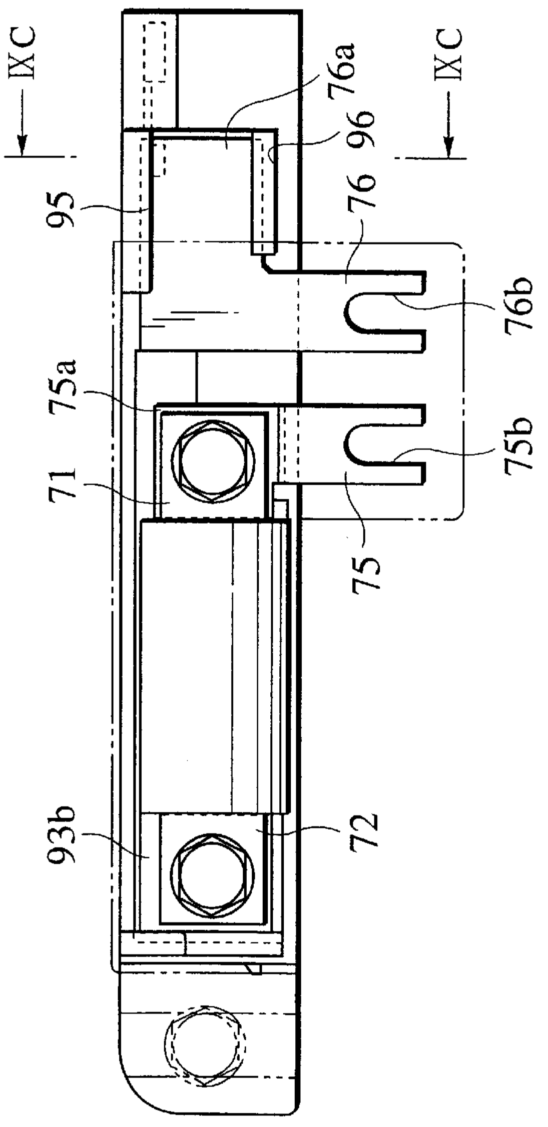
FIG. 9B is a side view of the fuse-accommodation box shown in FIG. 9A.
Figure 10A:
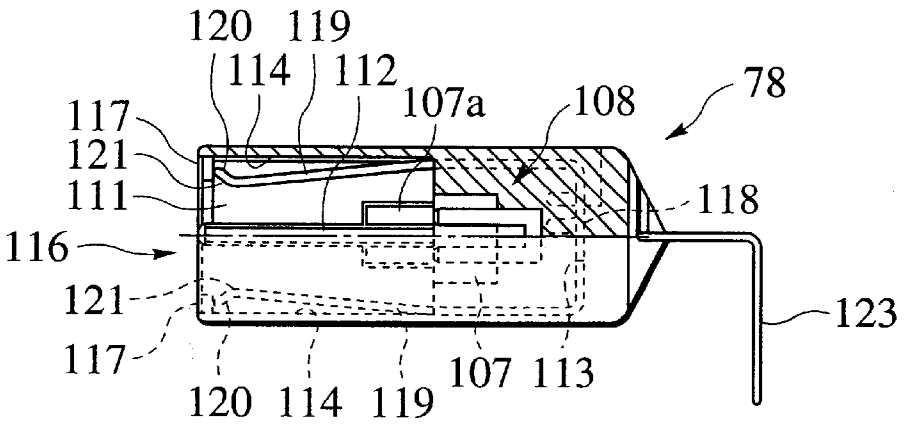
FIG. 10A is a cross sectional plan view of a plug of the power supply shut-off apparatus shown in FIG. 7.
Figure 10B:
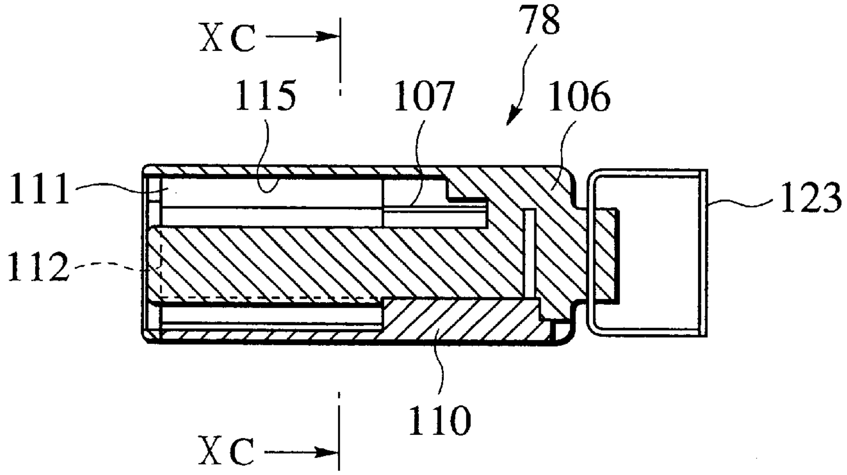
FIG. 10B is a cross sectional side view of the plug shown in FIG. 10A.
Figure 10C:
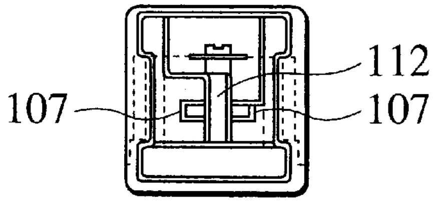
FIG. 10C is a cross sectional view of the plug shown in FIG. 10B taken along the line XC—XC.

As shown in FIGS. 9A, 9B and 9C, holding grooves 95 and 96 into which a tip end of the one side terminal 93*a* of the intermediate bus bar 93 fits are formed on the insulation wall 79 on the side of the terminal holding surface 91. By fitting the tip end of the one side terminal 93*a* of the intermediate bus bar 93 into the holding grooves 95 and 96, the intermediate bus bar 93 is prevented from moving with respect to the terminal holding surface 91, and its wobble is prevented. Further, holding grooves 97 and 98 into which a tip end of the terminal 76*a* of the load-side bus bar 76 fits are formed on the side of the terminal holding surface 92. By fitting the tip end of the terminal 76*a* of the load-side bus bar 76 into the holding grooves 97 and 98, the wobble of the load-side bus bar 76 from the terminal holding surface 92 is prevented, and the holding grooves 95, 96, 97 and 98 formed in the terminal holding surfaces 91 and 92 of opposite surfaces of the insulation wall 79 constitute terminal holding surfaces 91 and 92 of opposite surfaces of the insulation wall 79 constitute the wobble-suppressing means 80.

Insulation flanges 99, 99 equal to or slightly shorter than thickness of the intermediate bus bar 93 and the thickness of the load-side bus bar 76 are integrally formed on upper and lower surfaces of the insulation wall 79 on the side of the terminal holding surfaces 91 and 92. By providing the insulation flanges 99, 99, the insulating length between the terminal 93*b* of the intermediate bus bar 93 and the terminal 76*a* of the load-side bus bar 76 is elongated.

The insulation wall 79 is formed at its substantially central portion with a fitting elongated hole 103 along the longitudinal direction of the fuse 73.

Two terminal accommodating chambers 104, 104 are formed in the connector 90 provided on the upper surface of the insulation wall 79 along the longitudinal direction of the fuse 73. Female terminals 105, 105 are respectively accommodated in the terminal accommodating chambers 104, 104. The connector 90 is fitted to a plug housing 106 of the plug 78 which is mounted to the mounting portion 77, and male terminals 107 projected from the plug housing 106 are connected to the female terminals 105.

The plug 78 is formed of the plug housing 106, a terminal member 108 assembled into the plug housing 106, and a male terminal 107 connected to the female terminal 105 of the connector 90. The plug housing 106 is formed of a housing portion 109 and a cover 110. The housing portion 109 is integrally formed with a fitting groove 111, and an engaging member 112 which is fitted to a fitting elongated hole 103 formed in the insulation wall 79.

The fitting groove 111 is formed of a bottom wall 113, a pair of side walls 114, 114, and an upper wall 115 connecting upper surfaces of the pair of side walls 114, 114. A mounting opening 116 is formed in a surface of the fitting groove 111 opposed to the bottom wall 113. Stopping walls 107, 107 projecting in a direction approaching each other are formed on the pair of side walls 114, 114 at locations closer to the mounting opening 116. The stopping walls 107, 107 prevent the terminal member 108 assembled into the fitting groove 111 from falling out.

The terminal member 108 comprises a base plate 118 and a pair of resilient contact plates 119, 119 which are bent in the same direction from opposite sides of the base plate 118, and the terminal member 108 is formed into a U-shape. The pair of resilient contact plates 119, 119 can be resiliently deformed with respect to the base plate 118. Each of the resilient contact plates 119, 119 comprises an inwardly bent resilient piece 120, a stopping piece 121 which is extended outwardly from the resilient piece 120, and a contact top 112 located between the resilient piece 120 and the stopping piece 121, and the resilient contact plate 119 is formed into a mountain-shape. The base plate 118 is integrally embedded in the bottom wall 113 of the plug housing 106, and the stopping pieces 121, 121 abut against the stopping walls 107, 107.

A contact portion 107*a* of the male terminal 107 projects from the bottom wall 113 of the fitting groove 111. The female terminal 105 and the male terminal 107 are connected to each other in a state where the plug 78 is mounted to the mounting portion 77. With this arrangement, it is detected that the plug 78 is mounted to the mounting portion 77, and the load and the power supply are connected to each other.

The plug 78 is provided with a lock lever 123 outside the housing portion 109. The lock lever 123 engages an engaging portion 124 formed on the insulation cover 83 which covers the mounting portion 77 to prevent the plug 78 from falling out from the mounting portion 77.

Next, a procedure for mounting the plug 78 to the mounting portion 77 to connect the fuse 73 to the load and the power supply, and a procedure for detaching the plug 78 from the mounting portion 77 to electrically disconnect the load and the power supply will be explained.

As shown in FIG. 7, the fuse 73 is accommodated in the accommodating portion 87, and the one terminal 71 is fastened and fixed by the bolt 88 and the nut 89 together with the terminal 75*a* of the power supply-side bus bar 75. The other terminal 72 is fastened and fixed by the bolt 88 and the nut 89 together with the other terminal 93*b* of the intermediate bus bar 93. In this state, the intermediate bus bar 93 passes through between the electric shock preventing wall 94 and the side wall 85, and the one terminal 93 is fixed to the one terminal holding surface 91 of the insulation wall 79. The terminal 76*a* of the load-side bus bar 76 is fixed to the other terminal holding surface 92. The terminal 93*a* of the intermediate bus bar and the terminal 76*a* of the load-side bus bar 76 are prevented from moving from the terminal holding surfaces 91 and 92 by means of the holding grooves 95, 96, 97 and 98 which are the wobble-suppressing means 80, and this prevents the wobble of the terminals 93*a* and 76*a*.

Figure 11A:
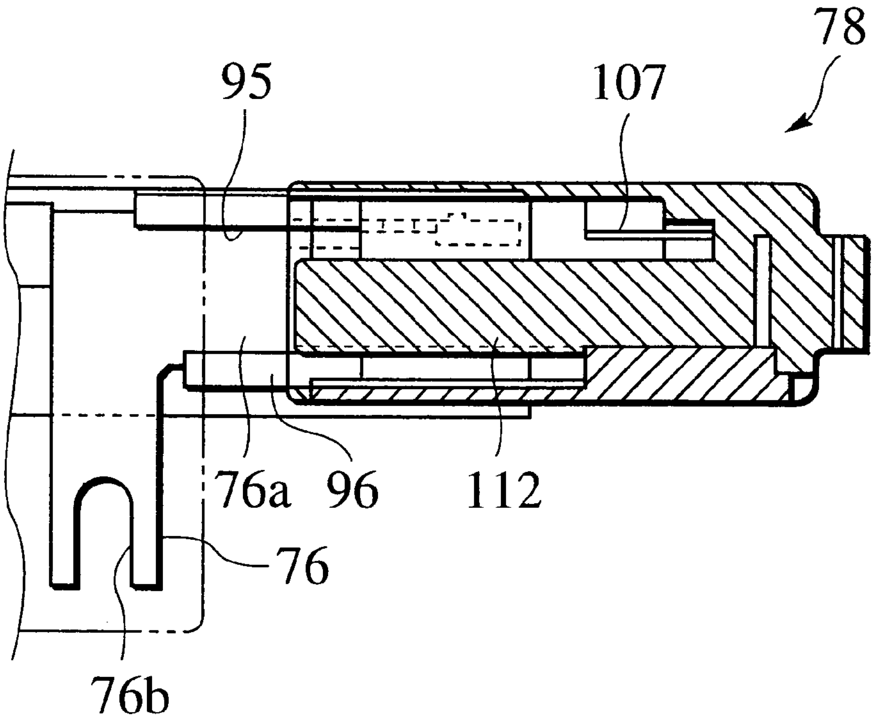
FIG. 11A is a cross sectional side view showing a fitting state when the plug of the power supply shut-off apparatus shown in FIG. 7 is mounted to a mounting portion.
Figure 11B:
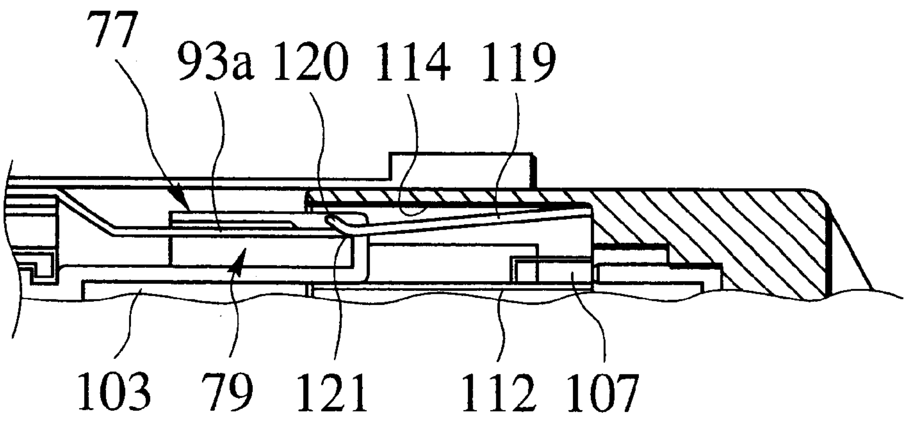
FIG. 11B is a cross sectional plan view showing a half of the fitting state from the center shown in FIG. 11A.

As shown in FIGS. 11A and 11B, if the plug 78 is pushed in the mounting portion 77 along the longitudinal direction of the fuse 73, the engaging member 112 of the housing portion 109 is inserted into the fitting elongated hole 103 formed in the insulation wall 79, the resilient pieces 120, 120 of the terminal member 108 are deflected outwardly, and the contact tops 122, 122 come into contact with the one side terminal 93*a* of the intermediate bus bar 93 and the terminal 76*a* of the load-side bus bar 76. The plug 78 is further pushed into the mounting portion 77, as shown in FIGS. 8 and 11A, until the end surface of the insulation wall 79 abuts against the bottom wall 113 of the fitting groove 111. With this movement, the load-side bus bar 76 and the intermediate bus bar 93 are electrically connected by the terminal member 108, the load-side bus bar 76 is electrically connected to the power supply-side bus bar 75 through the fuse 73, and the load and the power supply are connected.

Next, when the plug 78 is pulled out from the mounting portion 77 from the above-described state, the housing portion 109 is grasped and pulled out laterally along the longitudinal direction of the fuse 73. If the plug 78 is pulled out laterally, the contact tops 122, 122 of the terminal member 108 slide on the one side terminal 93*a* of the intermediate bus bar 93 and the terminal 76*a* of the load-side bus bar 76, and the engaging member 112 moves in the fitting elongated hole 103, and if the plug 78 is further pulled out, the plug 78 is detached from the mounting portion 77. If the plug 78 is detached from the mounting portion 77, the terminal member 108 is separated from the terminals 93*a* and 76*a* and thus, the terminals 93*a* and 76*a* are electrically disconnected. With this, the load-side bus bar 76 and the terminal 72 of the fuse 73 are interrupted, and the power supply and the load are interrupted.

In this state, the terminal 76*a* of the load-side bus bar 76 and the terminal 93*a* of the intermediate bus bar 93 are brought into insulated state by the insulation wall 79 and the insulation flanges 99, 99.

According to the present embodiment, the terminal 93*a* of the intermediate bus bar 93 and the terminal 76*a* of the load-side bus bar 76 located on the opposite surfaces of the insulation wall 79 are prevented from moving by means of the holding grooves 95, 96, 97 and 98 which are the wobble-suppressing means 80. Therefore, when the terminal 108 is mounted astride the insulation wall 79, its insertion force is not varied.

Also when the terminal 108 is pulled out from the insulation wall 79, since the terminal 93*a* of the intermediate bus bar 93 and the terminal 76*a* of the load-side bus bar 76 are not wobbled, the terminal 108 can easily be pulled out from the insulation wall 79. Therefore, excellent operability can be obtained.

Further, since the plug 78 is mounted into the mounting portion 77 along the longitudinal direction of the fuse 73, even when operation spaces can not be obtained in the surroundings in the widthwise direction of the fuse-accommodating box 74, the plug 78 can be mounted to the mounting portion 77 from the direction along the longitudinal direction of the fuse-accommodating box 74. With this arrangement, the flexibility of mounting place of the fuse-accommodating box 74 is enhanced.

Further, since the terminal 93*a* of the intermediate bus bar 93 and the terminal 76*a* of the load-side bus bar 76 are located such as to sandwich the insulation wall 79 therebetween, a reliable insulating state can be obtained by this insulation wall 79.

Moreover, since the terminal member 108 assembled into the plug 78 is mounted to the mounting portion 77, the terminal 93*a* of the intermediate bus bar 93 and the terminal 76*a* of the load-side bus bar 76 are not unintentionally connected, and the insulation state can be secured sufficiently.

Further, even if the accommodating position of the fuse 73 accommodated in the fuse-accommodating box 74 is slightly deviated and the terminals 71 and 72 of the fuse 73 are deviated, such deviation is absorbed by the connected portion between the other side terminal 93*b* of the intermediate bus bar 93 and the terminal 72 of the fuse 73. Therefore, when the one side terminal 93*a* of the intermediate bus bar 93 is positioned on the one surface side of the insulation wall 79 of the one side terminal 93*a,* the positional deviation is not generated, and it can be positioned and fixed in a predetermined position.

The load can be directly connected to the power supply by directly connecting the power supply-side terminal 75*b* of the power supply-side bus bar 75 to the power supply-side terminal. The power supply can be directly connected to the load by directly connecting the load-side terminal 76*b* of the load-side bus bar 76 to the load-side terminal. Therefore, wiring operation is unnecessary, and parts for wiring operation are unnecessary.

Further, the fuse 73 accommodated in the fuse-accommodating box 74 is shielded from outside by the insulation cover 83 which closes the opening of the fuse-accommodating box 74. As a result, the fuse 73 can be protected from outside, the fuse 73 and terminals 71 and 72 thereof are protected against unintentional contact, and safety is enhanced.

Figure 12:
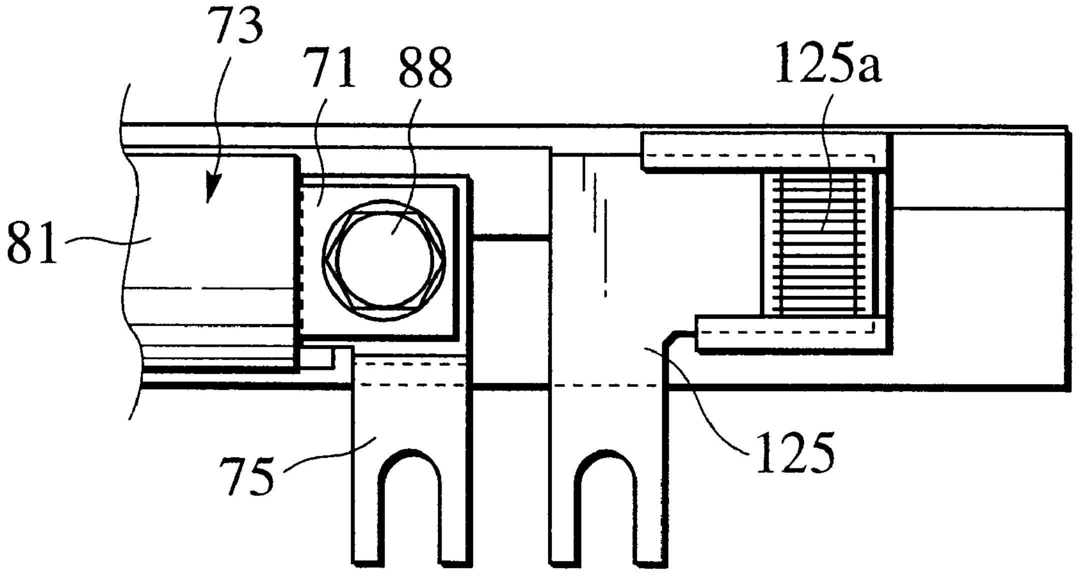
FIG. 12 is a side view showing a modification of a terminal of a load side bus bar of the power supply shut-off apparatus shown in FIG. 7.

FIG. 12 shows show a modification of another load-side bus bar 125. In this load-side bus bar 125, a terminal 125 is formed such that it is divided into a plurality of pieces in the insertion direction of the plug 78 like a comb.

[Third Embodiment]

Figure 13:
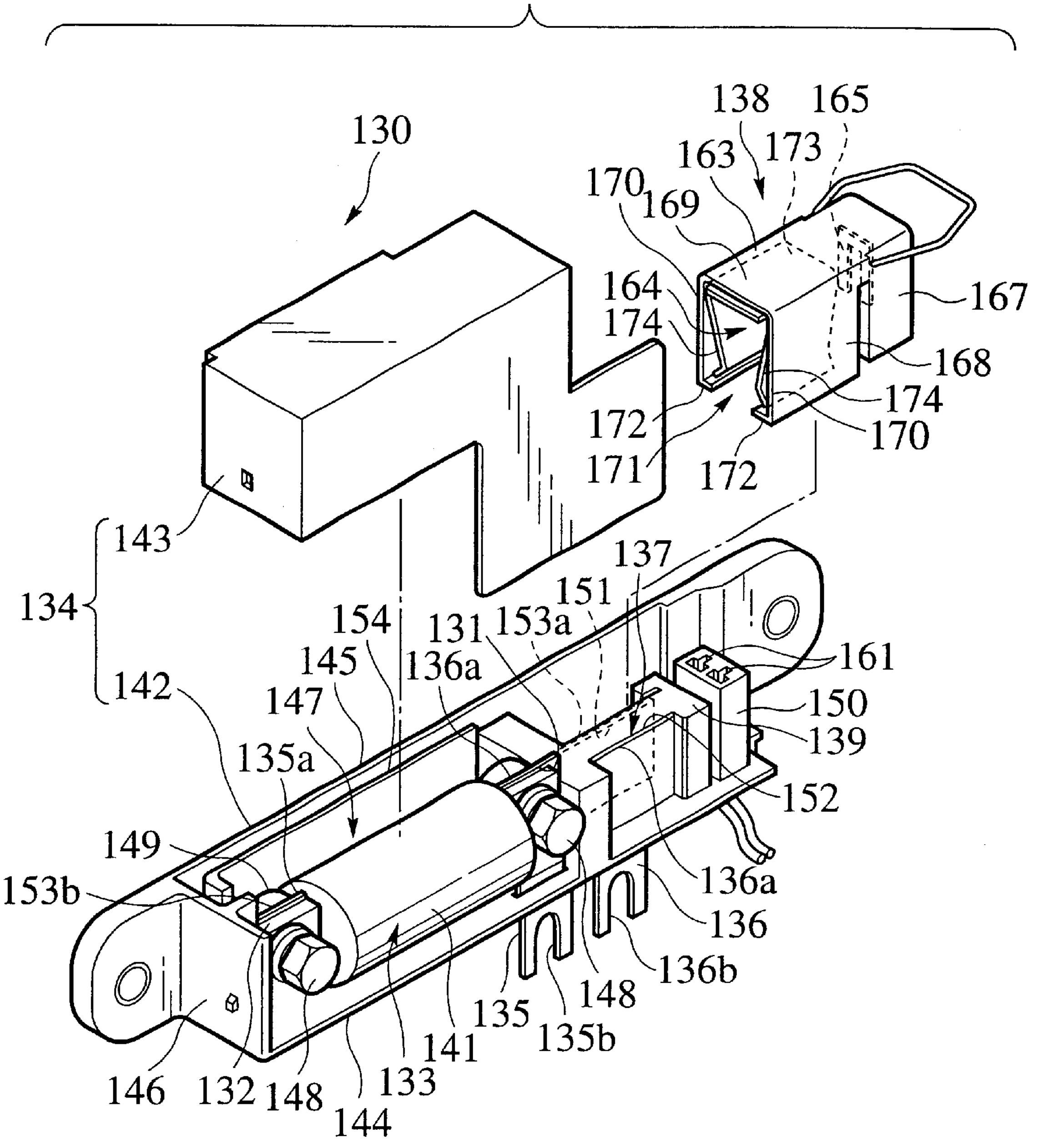
FIG. 13 is an exploded perspective view showing a power supply shut-off apparatus of a third embodiment.

A third embodiment will be explained using FIGS. 13 to 17C. FIG. 13 is an exploded perspective view showing a power supply shut-off apparatus 130 of the third embodiment, and FIG. 14 is a cross sectional view showing the assembled power supply shut-off apparatus 130.

Figure 14:
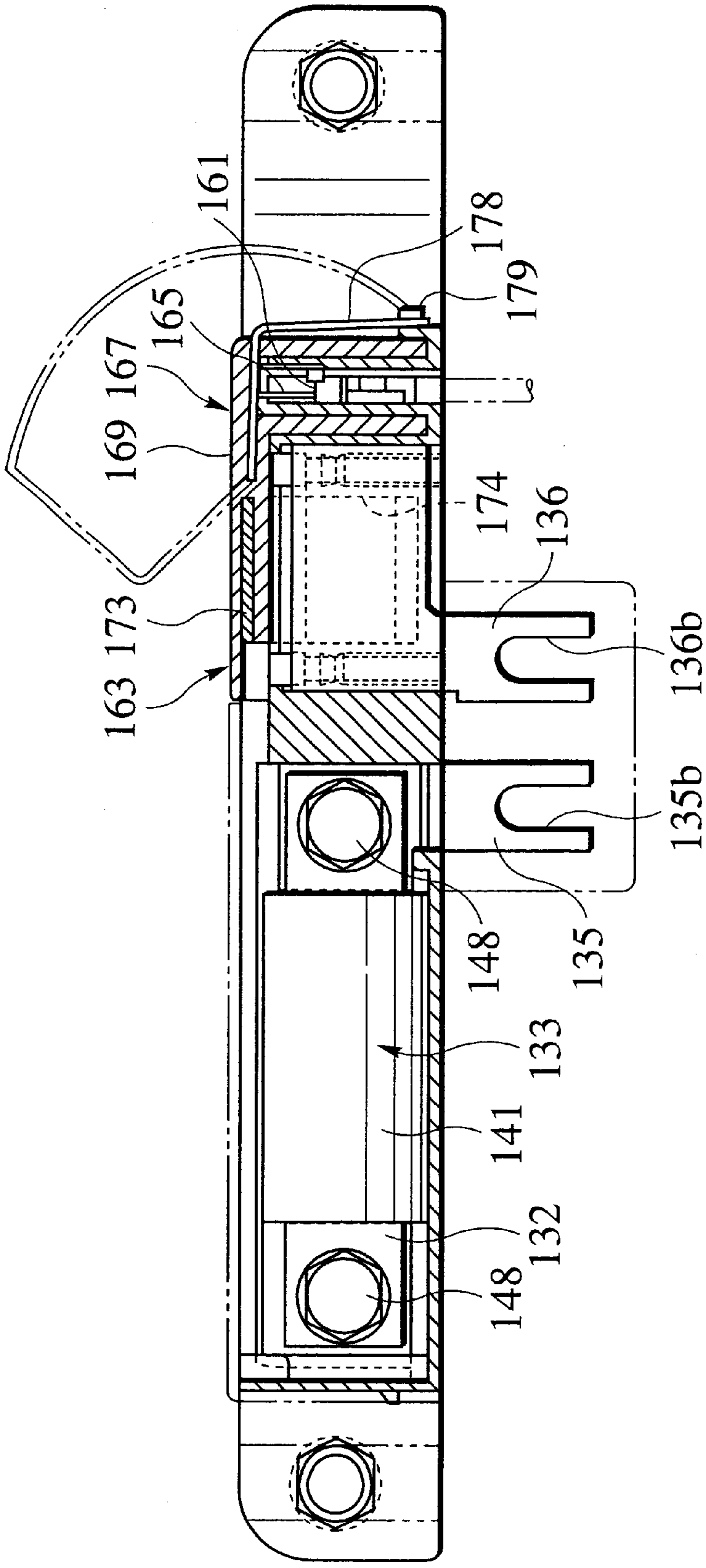
FIG. 14 is a cross sectional view showing the assembled power supply shut-off apparatus shown in FIG. 13.

As shown in FIGS. 13 and 14, the power supply shut-off apparatus 130 includes a fuse 133 having a pair of terminals 131 and 132, a fuse-accommodating box 134 for accommodating the fuse 133 therein, a power supply-side bus bar 135 for connecting the one of the terminals 131 of the fuse 133 accommodated in the fuse-accommodating box 134 and the power supply (not shown), a load-side bus bar 136 for connecting the other terminal 132 and a load (not shown), and a plug 138 which is mounted to a mounting portion 137 of the fuse-accommodating box 134 or detached from the mounting portion 137 for connecting and disconnecting the other terminal 132 and the load-side bus bar 136, thereby connecting and disconnecting the power supply and the load through the fuse 133.

The mounting portion 137 is provided with an insulation wall 139, and with wobble-suppressing means 80 for preventing terminals 136*a* and 153*a* disposed on opposite surfaces of the insulator 139 from wobbling.

The fuse 133 comprises a columnar fuse body 141, and the pair of plate-like terminals 131 and 132 project from opposite sides of the fuse body 141. Each of the terminals 131 and 132 is provided at its substantially central portion with a screw-fixing hole. The fuse 133 is accommodated in the fuse-accommodating box 134.

The fuse-accommodating box 134 is formed of an accommodating case 142 and an insulation cover 143 for closing an opening of the accommodating case 142. The accommodating case 142 is formed of a base wall 144, and a side wall 145 rising from one side of the base wall 144. The base wall 144 is formed at its longitudinally one side with a vertical wall 146 for connecting the base wall 144 and the side wall 145. An accommodating portion 147 in which the fuse 133 is accommodated is formed in a space surrounded by the vertical wall 146, the base wall 144 and the side wall 145.

By fastening and fixing the one terminal 131 of the fuse 132 and the terminal 135*a* of the power supply-side bus bar 135 by means of bolts 148 and nuts 149, the one terminal 131 of the fuse 133 is electrically connected to the power supply-side bus bar 135. The power supply-side bus bar 135 includes a power supply-side terminal 135*b* which is directly connected to a power supply-side terminal (not shown).

The mounting portion 137 is formed outside the one terminal 131 of the fuse 133. An insulation wall 139 rising from the base wall 144, and a connector 150 disposed in series with the insulation wall 139 and rising from the base wall 144.

Terminal holding surfaces 151 and 152 are respectively formed on opposite surfaces of the insulation wall 139. One side terminal 153*a* of an intermediate bus bar 153 is located on the one terminal holding surface 151, and an intermediate bus bar 153 is located on the one terminal holding surface 151, and the terminal 136*a* of the load-side bus bar 136 is located on the other terminal holding surface 152. The load-side bus bar 136 includes a load-side terminal 136*b* which is directly connected to a load-side terminal (not shown). The intermediate bus bar 153 passes through between an electric shock preventing wall 154 and the side wall 145, and the other side terminal 153*b* is fastened to the other terminal 132 by the bolt 148 and the nut 149, and the other terminal 132 of the fuse 133 and the intermediate bus bar 153 are electrically connected.

Figures 15A, 15B, 15C:
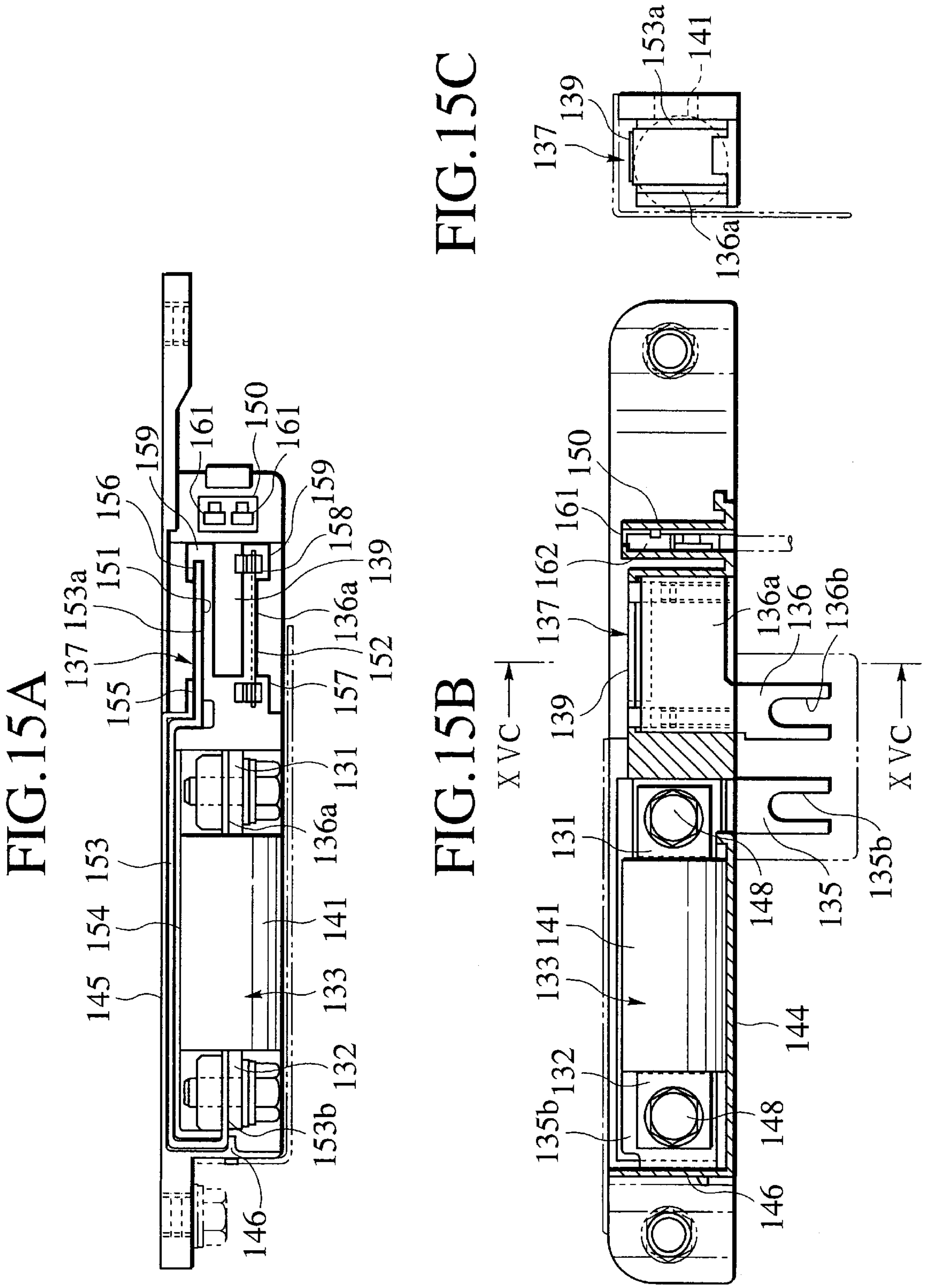
FIG. 15A is a plan view of a fuse-accommodation box of the power supply shut-off apparatus shown in FIG. 13.
FIG. 15B is a side view of the fuse-accommodation box shown in FIG. 15A.
FIG. 15C is a cross sectional view of the fuse-accommodation box shown in FIG. 15B taken along the line XVC—XVC in FIG. 15B.
Figure 16A:
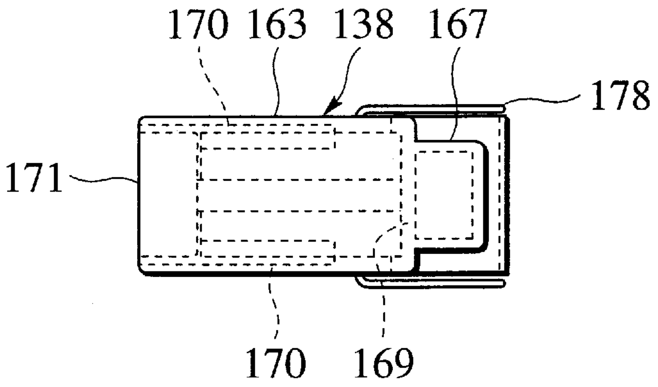
FIG. 16A is a plan view of a plug of the power supply shut-off apparatus shown in FIG. 13.
Figure 16B:
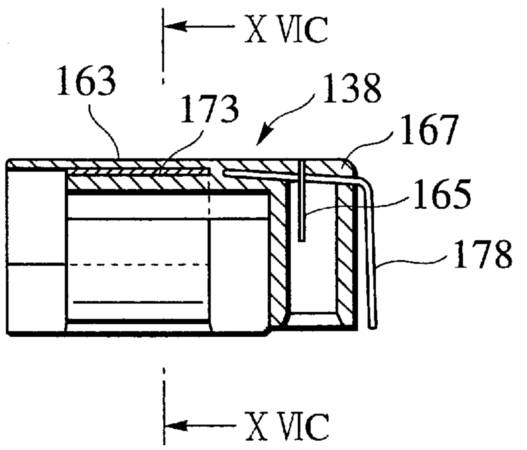
FIG. 16B is a cross sectional side view of the plug shown in FIG. 16A.
Figure 16C:
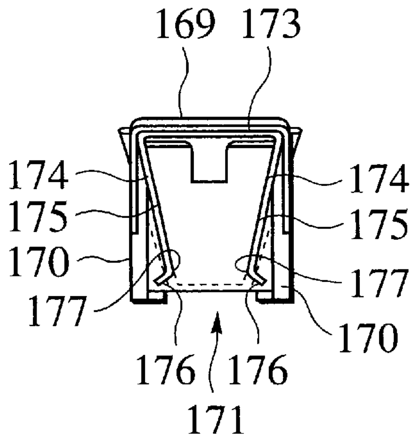
FIG. 16C is a cross sectional view of the plug shown in FIG. 16B taken along the line XVIC—XVIC.

As shown in FIG. 15, holding grooves 155 and 156 into which opposite tip ends of the one side terminal 153*a* of the intermediate bus bar 153 fit are formed on the insulation wall 139 on the side of the terminal holding surface 151. By fitting the tip end of the one side terminal 153*a* of the intermediate bus bar 153 into the holding grooves 155 and 156, the intermediate bus bar 153 is prevented from moving with respect to the terminal holding surface 151, and its wobble is prevented. Further, holding grooves 157 and 158 into which opposite sides of the terminal 136*a* of the load-side bus bar 136 fit are formed on the side of the terminal holding surface 152. By fitting the opposite sides of the terminal 136*a* of the load-side bus bar 136 into the holding grooves 157 and 158, the wobble of the load-side bus bar 136 from the terminal holding surface 152 is prevented, and the holding grooves 155, 156, 157 and 158 formed in the terminal holding surfaces 151 and 152 of opposite surfaces of the insulation wall 139 constitute terminal holding surfaces 151 and 152 of opposite surfaces of the insulation wall 139 constitute the wobble-suppressing means 140.

Insulation flanges 159, 159 equal to or slightly shorter than thickness of the intermediate bus bar 153 and the thickness of the load-side bus bar 136 are integrally formed on an upper surface of the insulation wall 139 on the side of the terminal holding surfaces 151 and 152. By providing the insulation flanges 159, 159, the insulating length between the terminal 153*b* of the intermediate bus bar 153 and the terminal 136*a* of the load-side bus bar 136 is elongated.

The connector 150 rises in series with the insulation wall 139, and two terminal-accommodating chambers 161, 161 are formed in the connector 150. A female terminal 162 is accommodated in each of the terminal-accommodating chambers 161, 161. The connector 150 is fitted to a hood 167 of the plug 138 mounted to the mounting portion 137, and a male terminal 165 projecting from the hood 167 is connected to each female terminal 162.

The plug 138 is formed of the plug housing 163, a terminal member 164 assembled into the plug housing 163, and a male terminal 165 connected to the female terminal 162 of the connector 150. The plug housing 163 is integrally formed with a grasping plate 168, a fitting groove 166 formed in one side of a lower surface of the grasping plate 168, and a fitting hood 167 provided on the other side.

The fitting groove 166 is formed of a bottom wall 169 and a pair of side walls 170, 170, and a mounting opening 171 is formed in a surface of the fitting grove 166 opposed to the bottom wall 169. The insulation wall 139 is inserted in the mounting opening 171. Stopping walls 172, 172 projecting in a direction approaching each other are formed on the pair of side walls 170, 170 at locations closer to the mounting opening 171. The stopping walls 172, 172 prevent the terminal member 164 assembled into the fitting groove 166 from falling out.

The terminal member 164 comprises a base plate 173 and a pair of resilient contact plates 174, 174 which are bent in the same direction from opposite sides of the base plate 173, and the terminal member 164 is formed into a U-shape. The pair of resilient contact plates 174, 174 can be resiliently deformed with respect to the base plate 173. Each of the resilient contact plates 174, 174 comprises an inwardly bent resilient piece 175, a stopping piece 176 which is extended outwardly from the resilient piece 175, and a contact top 177 located between the resilient piece 175 and the stopping piece 176, and the resilient contact plate 174 is formed into a mountain-shape. The base plate 173 is integrally embedded in the plug housing 106, and the stopping pieces 176, 176 abut against the stopping walls 172, 172.

A contact portion 165*a* of the male terminal 165 projects from the hood 167 provided adjacent to the fitting groove 166. The connector 150 of the mounting portion 137 is fitted into the hood 167 in a state where the plug 138 is mounted to the mounting portion 137, and the female terminal 162 and the male terminal 165 of the connector 150 are connected. With this, the plug 138 is mounted to the mounting portion 137, and it is detected that the load and the power supply are connected.

In the plug 138, a lock arm 178 is provided outside the hood 167. The lock arm 178 engages the locking portion 179 provided on the mounting portion 137, and prevents the plug 138 from falling out from the mounting portion 137.

Next, a procedure for mounting the plug 138 to the mounting portion 137 to connect the fuse 133 to the load and the power supply, and a procedure for detaching the plug 138 from the mounting portion 137 to electrically disconnect the load and the power supply will be explained.

As shown in FIG. 13, the fuse 133 is accommodated in the accommodating portion 147, and the one terminal 131 is fastened and fixed by the bolt 148 and the nut 149 together with the terminal 135*a* of the power supply-side bus bar 135. The other terminal 132 is fastened and fixed by the bolt 148 and the nut 149 together with the other terminal 153*b* of the intermediate bus bar 153. In this state, the intermediate bus bar 153 passes through between the electric shock preventing wall 154 and the side wall 145, and the one terminal 153 is fixed to the one terminal holding surface 151 of the insulation wall 139. The terminal 136*a* of the load-side bus bar 136 is fixed to the other terminal holding surface 152. The terminal 153*a* of the intermediate bus bar and the terminal 136*a* of the load-side bus bar 136 are prevented from moving from the terminal holding surfaces 151 and 152 by means of the holding grooves 155, 156, 157 and 158 which are the wobble-suppressing means 140, and this prevents the wobble of the terminals 153*a* and 136*a*.

Figure 17C:
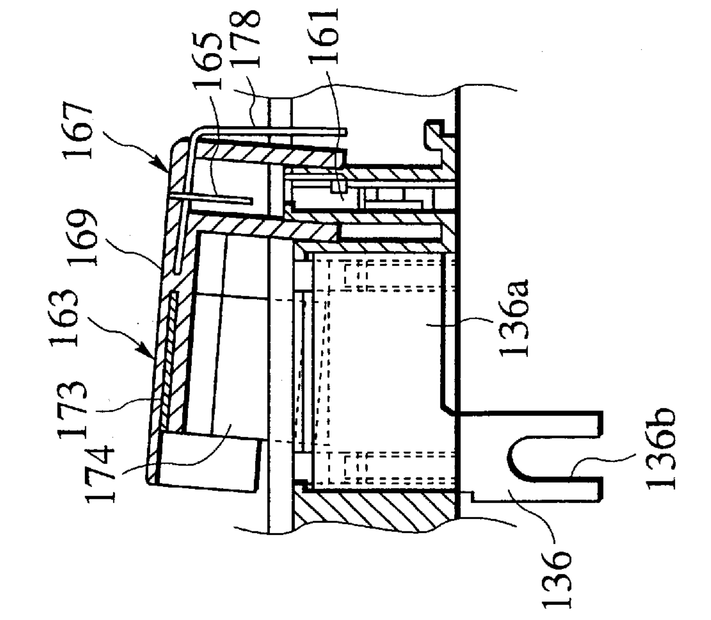
FIG. 17C is a cross sectional view showing a slanting fitting state when the plug shown in FIG. 17A is inserted into the mounting portion.
Figure 17B:
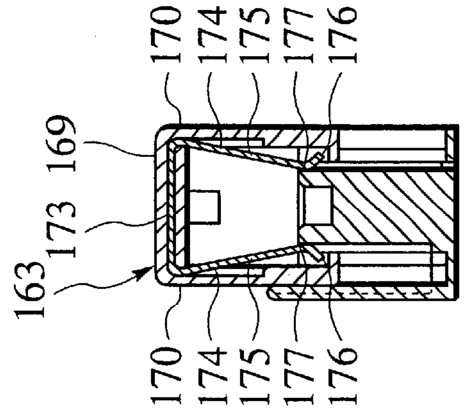
FIG. 17B is a cross sectional view of the normal fitting state in FIG. 17A taken along the line XVIIB—XVIIB.
Figure 17A:
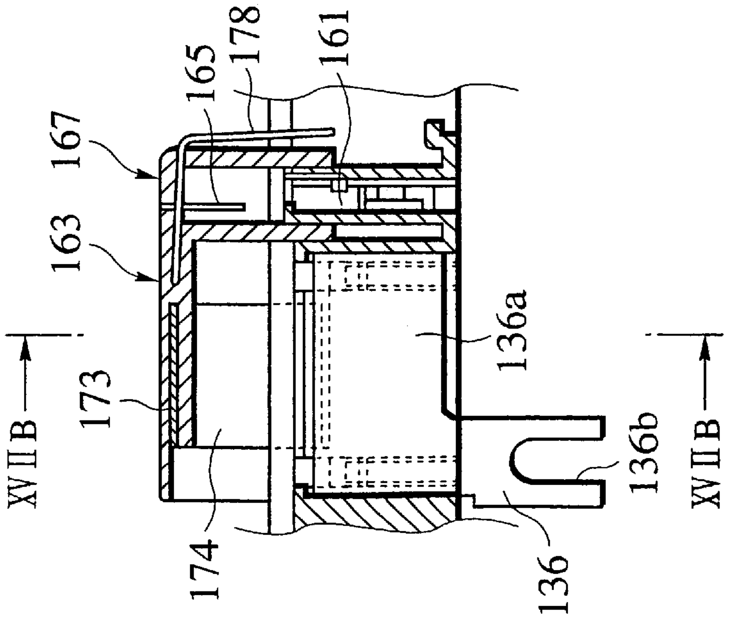
FIG. 17A is a cross sectional view showing a normal fitting state when a plug of the power supply shut-off apparatus shown in FIG. 13 is inserted into a mounting portion.

Then, as shown in FIGS. 17A and 17B, if the plug 138 is pushed into the mounting portion 137 in a state where the plug 138 is placed on the mounting portion 137, the resilient pieces 175, 175 of the terminal member 164 are deflected outwardly, and the contact tops 117 and 177 come into contact with the one side terminal 153*a* of the intermediate bus bar 153 and the terminal 136*a* of the load-side bus bar 136. If the plug 138 is further pushed into the mounting portion 137, the upper surface side of the insulation wall 139 abuts against the bottom wall 169 of the fitting groove 166 as shown in FIG. 14. With this, the load-side bus bar 136 and the intermediate bus bar 153 are electrically connected through the terminal member 163, the load-side bus bar 136 is electrically connected to the power supply-side bus bar 135 through the fuse 133, and the load and the power supply are electrically connected.

As shown in FIG. 17C, when the plug 138 is pushed into the mounting portion 137, even if an attempt is made to fit the plug 138 into the mounting portion 137 obliquely, the inner wall of the hood 167 is guided by the outer peripheral surface of the connector 150, the fitting direction is corrected properly, and the plug 138 is fitted in a proper state as shown in FIG. 14.

Next, when the plug 138 is pulled out from the mounting portion 137 from the above state, the grasping plate 168 is grasped and pulled upward. If the plug 138 is pulled upward, the contact tops 177, 177 of the terminal member 164 slide on the one side terminal 135*a* of the intermediate bus bar 153 and the terminal 136 of the load-side bus bar 136, and if the plug 138 is further pulled upward, the plug 138 is detached from the mounting portion 137. If the plug 138 is detached from the mounting portion 137, since the terminal member 164 is separated from the terminals 153*a* and 136*a*, the terminals 153*a* and 136*a* are electrically disconnected. With this, the load-side bus bar 136 and the terminal 132 of the fuse 133 are electrically disconnected, and the power supply and the load are electrically disconnected.

In this state, the terminal 136*a* of the load-side bus bar 136 and the one side terminal 153*a* of the intermediate bus bar 153 are brought into insulated state by the insulation wall 139 and the insulation flange 159.

According to the present embodiment, the one side terminal 153*a* of the intermediate bus bar 153 and the terminal 136*a* of the load-side bus bar 136 located on the opposite surfaces of the insulation wall 139 are prevented from moving by means of the holding grooves 155, 156, 157 and 158 which are the wobble-suppressing means 140. Therefore, when the terminal 168 is mounted astride the insulation wall 139, its insertion force is not varied.

Also when the terminal 168 is pulled out from the insulation wall 139, since the one side terminal 153*a* of the intermediate bus bar 153 and the terminal 136*a* of the load-side bus bar 136 are not wobbled, the terminal 168 can easily be pulled out from the insulation wall 139. Therefore, excellent operability can be obtained.

Further, since the plug 138 is mounted into the mounting portion 137 along a direction intersecting the longitudinal direction of the fuse 133, even when operation spaces can not be obtained in opposite sides of the longitudinal direction of the fuse-accommodating box 134, the plug 138 can be mounted to the mounting portion 137 from the direction along the direction intersecting the longitudinal direction of the fuse-accommodating box 134. With this arrangement, the flexibility of mounting place of the fuse-accommodating box 134 is enhanced.

Further, since the one side terminal 153*a* of the intermediate bus bar 153 and the terminal 136*a* of the load-side bus bar 136 are located such as to sandwich the insulation wall 139 therebetween, a reliable insulating state can be obtained by this insulation wall 139.

Moreover, since the terminal member 168 assembled into the plug 138 is mounted to the mounting portion 137, the terminal 153*a* of the intermediate bus bar 153 and the terminal 136*a* of the load-side bus bar 136 are not unintentionally connected, and the insulation state can be secured sufficiently.

Further, even if the accommodating position of the fuse 133 accommodated in the fuse-accommodating box 134 is slightly deviated and the terminals 131 and 132 of the fuse 133 are deviated, such deviation is absorbed by the connected portion between the other side terminal 153*b* of the intermediate bus bar 153 and the terminal 132 of the fuse 133. Therefore, when the one side terminal 153*a* of the intermediate bus bar 153 is positioned on the one surface side of the insulation wall 139 of the one side terminal 153*a*, the positional deviation is not generated, and it can be positioned and fixed in a predetermined position.

The load can be directly connected to the power supply by directly connecting the power supply-side terminal 135*b* of the power supply-side bus bar 135 to the power supply-side terminal. The power supply can be directly connected to the load by directly connecting the load-side terminal 136*b* of the load-side bus bar 136 to the load-side terminal. Therefore, wiring operation is unnecessary, and parts for wiring operation are unnecessary. Therefore, wiring operation is unnecessary, and parts for wiring operation are unnecessary.

Further, the fuse 133 accommodated in the fuse-accommodating box 134 is shielded from outside by the insulation cover 143 which closes the opening of the fuse-accommodating box 134. As a result, the fuse 133 can be protected from outside, the fuse 133 and terminals 131 and 132 thereof are protected against unintentional contact, and safety is enhanced.

[Fourth Embodiment]

Figure 18:
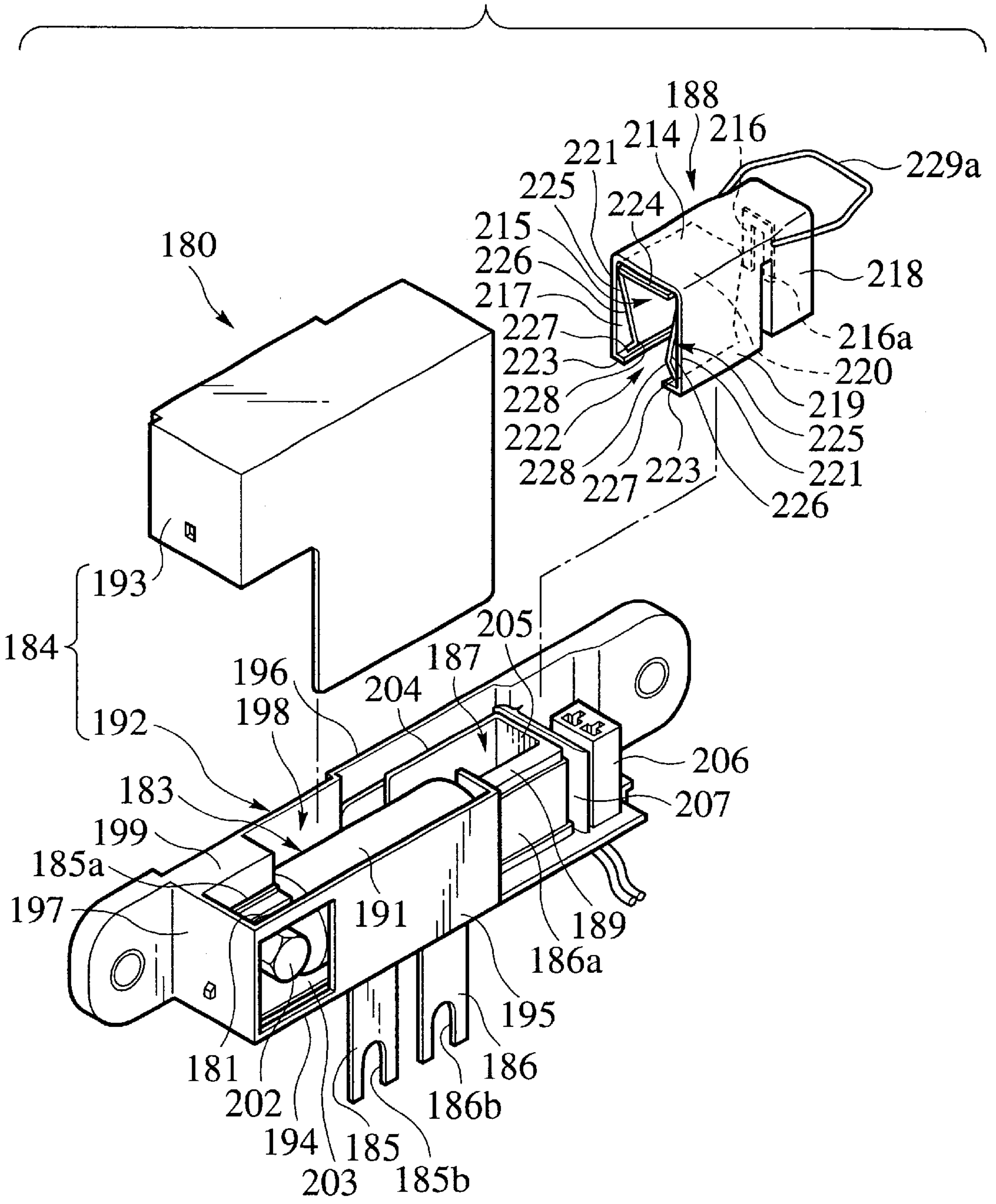
FIG. 18 is an exploded perspective view showing a power supply shut-off apparatus of a fourth embodiment.

A fourth embodiment will be explained using FIGS. 18 to 22. FIG. 18 is an exploded perspective view showing a power supply shut-off apparatus 180 of the fourth embodiment, FIG. 19A is a cross sectional view showing the assembled power supply shut-off apparatus 180, and FIG. 19B is a cross sectional view of the power supply shut-off apparatus 180 taken along the line XIXA—XIXA in FIG. 19A.

Figures 19A, 19B:
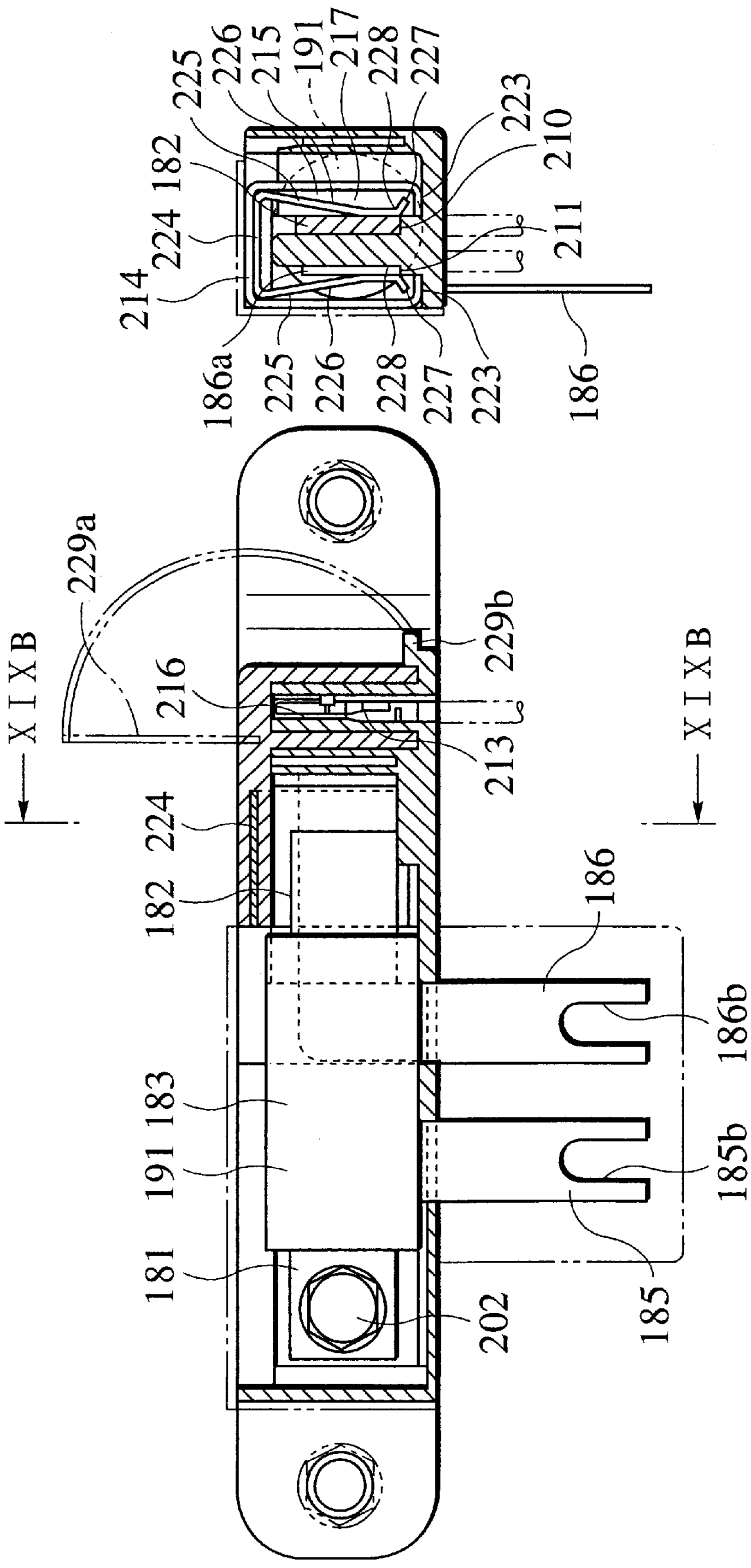
FIG. 19A is a cross sectional view showing the assembled power supply shut-off apparatus shown in FIG. 18.
FIG. 19B is a cross sectional view of the power supply shut-off apparatus shown in FIG. 19A taken along the line XIXB—XIXB in FIG. 19A.
Figure 20C:
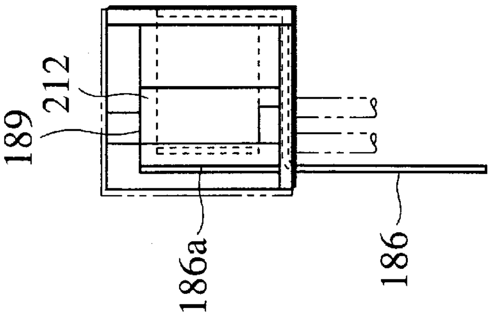
FIG. 20C is a cross sectional view of the fuse-accommodation box shown in FIG. 20B taken along the line XXC—XXC.
Figure 20A:
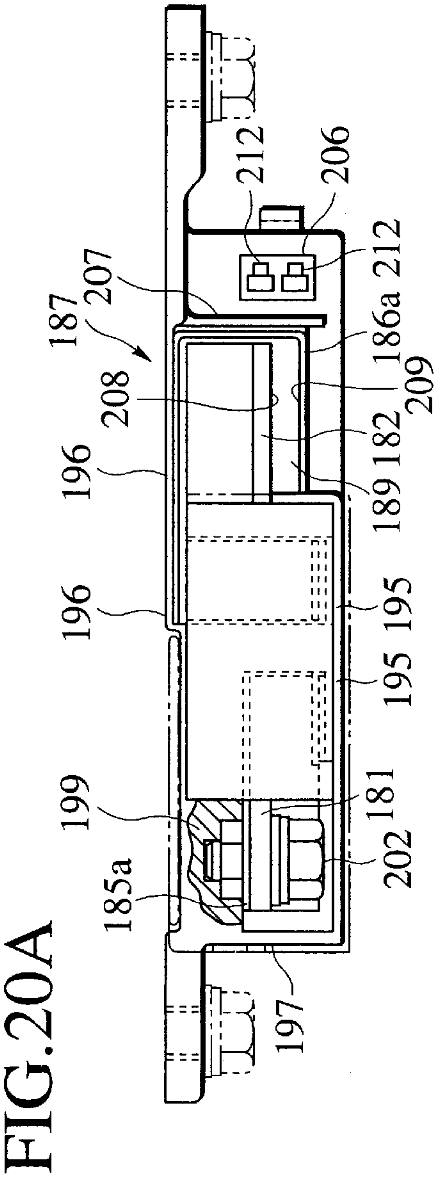
FIG. 20A is a plan view of a fuse-accommodation box of the power supply shut-off apparatus shown in FIG. 18.
Figure 20B:
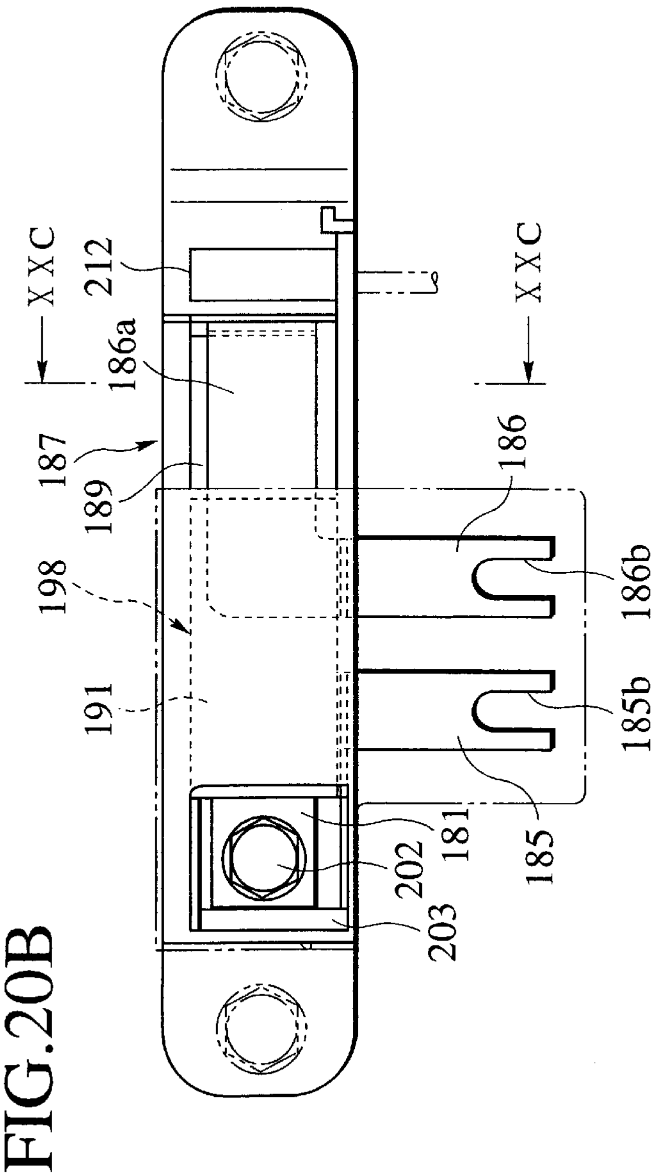
FIG. 20B is a cross sectional view of the fuse-accommodation box shown in FIG. 20A.
Figure 21A:
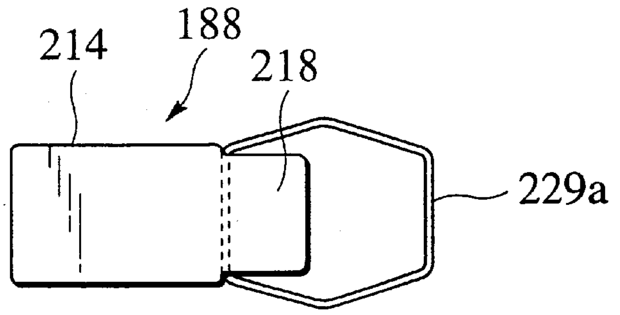
FIG. 21A is a plan view of a plug of the power supply shut-off apparatus shown in FIG. 18.
Figure 21B:
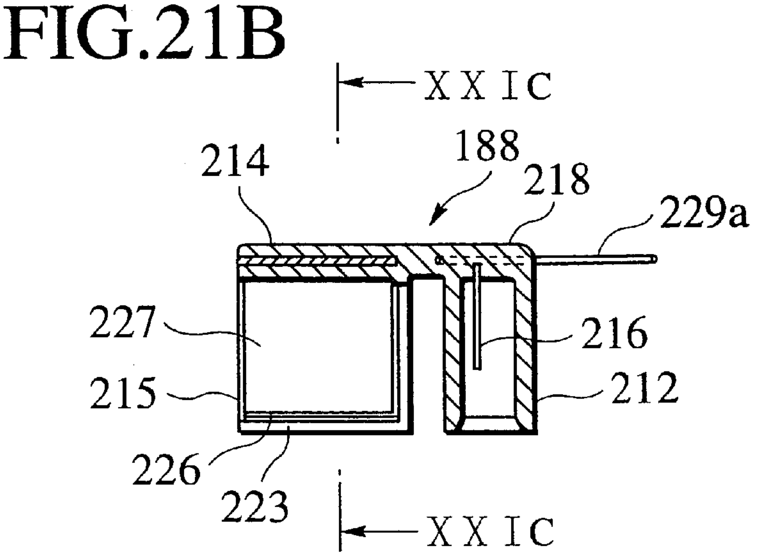
FIG. 21B is a cross sectional side view of the plug shown in FIG. 21A.
Figure 21C:
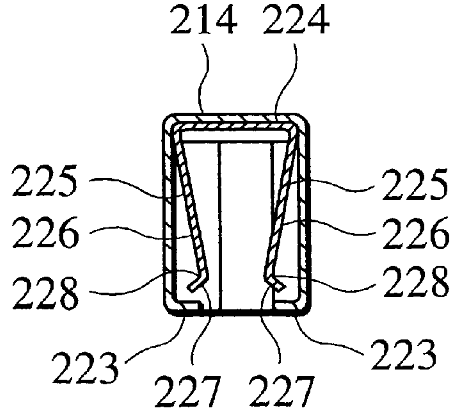
FIG. 21C is a cross sectional view of the plug shown in FIG. 21B taken along the line XXIC—XXIC.

As shown in FIGS. 18 and 19B, the power supply shut-off apparatus 180 includes a fuse 183 having a pair of terminals 181 and 182, a fuse-accommodating box 184 for accommodating the fuse 183 therein, a power supply-side bus bar 185 for connecting the one of the terminals 181 of the fuse 183 accommodated in the fuse-accommodating box 184 and the power supply (not shown), a load-side bus bar 186 for connecting the other terminal 182 and a load (not shown), and a plug 188 which is mounted to a mounting portion 187 of the fuse-accommodating box 184 or detached from the mounting portion 187 for connecting and disconnecting the other terminal 182 and the load-side bus bar 186, thereby connecting and disconnecting the power supply and the load through the fuse 183.

The mounting portion 187 is provided with an insulation wall 189. The insulation wall 189 is provided at its opposite surfaces with wobble-suppressing means 190 for preventing the wobbling of the other terminal 182 of the fuse 183 and the terminal 186*a* of the load-side bus bar 186.

The fuse 183 comprises a columnar fuse body 191, and the pair of plate-like terminals 181 and 182 project from opposite sides of the fuse body 191. One of the terminals 181 is provided at its substantially central portion with a screw-fixing hole. The fuse 183 is screwed and fixed in the fuse-accommodating box 184.

The fuse-accommodating box 184 is formed of an accommodating case 192 and an insulation cover 193 for closing an opening of the accommodating case 192. The accommodating case 192 is formed of a base wall 194, and front and rear side walls 195 and 196 rising from opposite sides of the base wall 194, and a vertical wall 197 connecting the base plate 194 and both the side walls 195 and 196 on one side in the longitudinal direction of the base wall 194. An accommodating portion 198 in which the fuse 183 is accommodated is formed in a space surrounded by the vertical wall 197, the base wall 194 and the side walls 195 and 196.

In the accommodating portion 198, a rectangular supporting block 199 projects from the rear side wall 196 toward the base wall 194. The supporting block 199 is formed with a screw hole 200, and a nut 201 is embedded in the screw hole 200. One of the terminals 181 of the fuse 183 accommodated in the accommodating portion 198 is located on a front surface side of the supporting block 199, the bolt 202 is inserted through the screw hole of the terminal 181 and threadedly engaged with the nut 201, thereby fixing and holding the fuse 183 in the accommodating portion 198.

The front side wall 195 is formed a notch window 203 at a location corresponding to the supporting block 199 provided on the rear side wall 196, and the bolt 202 is inserted from this notch window 203.

The base wall 194 is formed with a slit, and the terminal 185*a* of the power supply-side bus bar 185 is inserted from inside of the slit toward the front surface of the supporting block 199. The power supply-side bus bar 185 includes a power supply-side terminal 185*b* which is directly connected to a power supply-side terminal (not shown).

The one terminal 181 of the fuse 183 and the terminal 185*a* of the power supply-side bus bar 185 are fixed together to the supporting block 199 by the bolt 202 so that the one terminal 181 of the fuse 183 and the terminal 185*a* of the power supply-side bus bar 185 are electrically connected.

The mounting portion 187 is formed outside the accommodating portion 198. The mounting portion 187 is formed with the insulation wall 189 rising from the base wall 194, an electric shock preventing wall 204 provided between the insulation wall 189 and the rear side wall 196, and another electric shock preventing wall 205 connecting the electric shock preventing wall 204 and the insulation wall 189. Further outside the insulation wall 189, a connector 206 disposed in series with the insulation wall 189 rises from the base wall 194. An electric shock preventing wall 207 is provided between the insulation wall 189 and the connector 206.

The insulation wall 189 is formed at its opposite surfaces with terminal holding surfaces 208 and 209, respectively. The other terminal 182 is located on the one terminal holding surface 208, and the terminal 186*a* of the load-side bb 186 is located on the other terminal holding surface 209. The load-side bus bar 186 includes a load-side terminal 186*b* which is directly connected to a load-side terminal (not shown). The load-side bus bar 186 passes through between the electric shock preventing wall 205 and the electric shock preventing wall 207 as well as between the electric shock preventing wall 204 and the rear side wall 196, and further passes through between the fuse 183 and the base wall 194, and is located on the front surface side of the accommodating portion 198.

A holding groove 210 to which a tip end of the other terminal 182 of the fuse 183 is fitted is formed on the insulation wall 189 on the side of the terminal holding surface 208. By fitting the tip end of the terminal 182 of the fuse 182 to the holding groove 210, the holding groove 210 prevents the terminal 182 of the fuse 183 from moving with respect to the terminal holding surface 208 and from wobbling. Further, a holding groove 211 to which a tip end of the terminal 186*a* of the load-side bus bar 186 is fitted is formed on the side of the terminal holding surface 209. By fitting the tip end of the terminal 186*a* of the load-side bus bar 186 to the holding groove 211, the holding groove 211 prevents the terminal 186*a* of the load-side 186 from wobbling from the terminal holding surface 209.

The holding grooves 210 and 211 provided in the terminal holding surfaces 208 and 209 on the opposite surface of the insulation wall 189 constitute wobble-suppressing means 190.

The connector 206 rises in series with the insulation wall 189, and two terminal-accommodating chambers 212, 212 are formed in the connector 206. A female terminal 213 is accommodated in each of the terminal-accommodating chambers 212, 212. The connector 206 is fitted to a hood 218 of the plug 188 mounted to the mounting portion 187, and a male terminal 216 projecting from the hood 218 is connected to each female terminal 213.

The plug 188 is formed of the plug housing 214, a terminal member 215 assembled into the plug housing 214, and a male terminal 216 connected to the female terminal 213 of the connector 206. The plug housing 214 is integrally formed with a grasping plate 219, a fitting groove 217 formed in one side of a lower surface of the grasping plate 219, and a fitting hood 218 provided on the other side.

The fitting groove 217 is formed of a bottom wall 220 and a pair of side walls 221, 221, and a mounting opening 222 is formed in a surface of the fitting groove 217 opposed to the bottom wall 220. The insulation wall 189 is inserted in the mounting opening 222. Stopping walls 223, 223 projecting in a direction approaching each other are formed on the pair of side walls 221, 221 at locations closer to the mounting opening 222. The stopping walls 223, 223 prevent the terminal member 215 assembled into the fitting groove 217 from falling out.

The terminal member 215 comprises a base plate 224 and a pair of resilient contact plates 225, 225 which are bent in the same direction from opposite sides of the base plate 224, and the terminal member 215 is formed into a U-shape. The pair of resilient contact plates 225, 225 can be resiliently deformed with respect to the base plate 224. Each of the resilient contact plates 225, 225 comprises an inwardly bent resilient piece 226, a stopping piece 227 which is extended outwardly from the resilient piece 226, and a contact top 228 located between the resilient piece 226 and the stopping piece 227, and the resilient contact plate 225 is formed into a mountain-shape. The base plate 224 is integrally embedded in the plug housing 106, and the stopping pieces 227, 227 abut against the stopping walls 223, 223.

A contact portion 216*a* of the male terminal 216 projects from the hood 218 provided adjacent to the fitting groove 217. The connector 206 of the mounting portion 187 is fitted into the hood 218 in a state where the plug 188 is mounted to the mounting portion 187, and the female terminal 213 and the male terminal 216 of the connector 206 are connected. With this, the plug 188 is mounted to the mounting portion 187, and it is detected that the load and the power supply are connected.

In the plug 188, a lock arm 229*a* is provided outside the hood 218. The lock arm 229*a* engages the locking portion 229*b* provided on the mounting portion 187, and prevents the plug 188 from falling out from the mounting portion 187.

Next, a procedure for mounting the plug 188 to the mounting portion 187 to connect the fuse 183 to the load and the power supply, and a procedure for detaching the plug 188 from the mounting portion 187 to electrically disconnect the load and the power supply will be explained.

As shown in FIG. 18, the fuse 183 is accommodated in the accommodating portion 198, and the one terminal 181 is fastened and fixed by the bolt 202 together with the terminal 185*a* of the power supply-side bus bar 185. In this state, the other terminal 182 of the fuse 183 is fixed to the one terminal holding surface 208 of the insulation wall 189. The terminal 186*a* of the load-side bus bar 186 is fixed to the other terminal holding surface 209. The terminal 182 of the fuse 183 and the terminal 186*a* of the load-side bus bar 186 are prevented from moving from the terminal holding surfaces 208 and 209 by means of the holding grooves 210 and 211 which are wobble-suppressing means, and the wobbling is prevented.

Figure 22A:
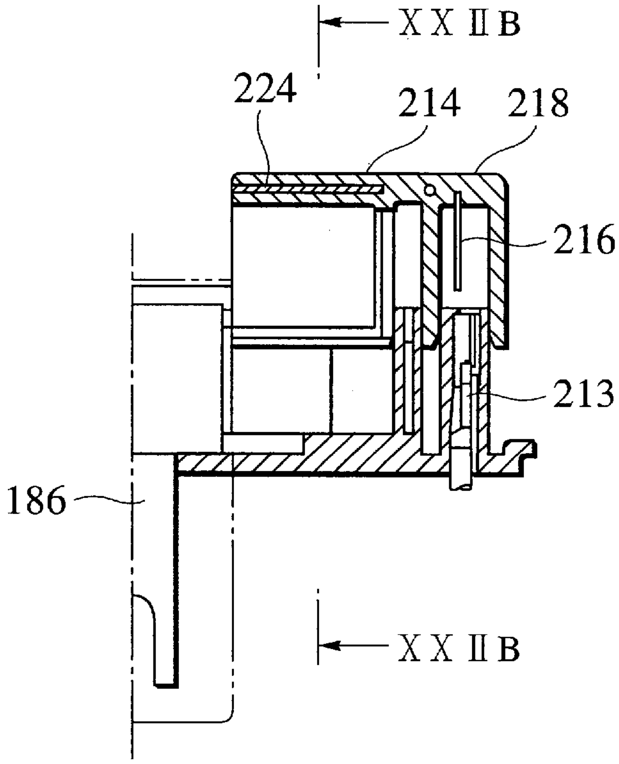
FIG. 22A is a cross sectional side view showing a fitting state when the plug of the power supply shut-off apparatus shown in FIG. 18 is mounted to a mounting portion.
Figure 22B:
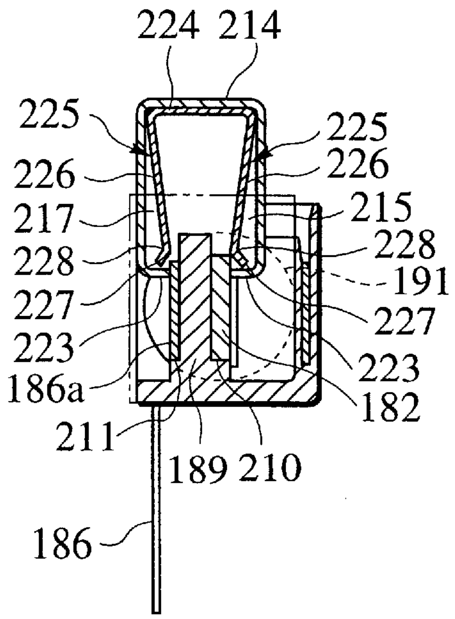
FIG. 22B is a cross sectional view of the fitting state shown in FIG. 22A taken along the line XXIIB—XXIIB.

As shown in FIGS. 22A and 22B, if the plug 188 is pushed into the mounting portion 187 in a state where the plug 188 is placed on the mounting portion 187, the resilient pieces 226, 226 of the terminal member 215 are deflected outwardly, and the contact tops 228, 228 come into contact with the terminal 182 of the fuse 183 and the terminal 186*a* of the load-side bus bar 186. If the plug 188 is further pushed into the mounting portion 187, the upper surface of the insulation wall 189 abuts against the bottom wall 220 of the fitting groove 217 as shown in FIGS. 19A and 19B. With this, the load-side bus bar 186 and the fuse 183 are electrically connected through the terminal member 215, the load-side bus bar 186 is electrically connected to the power supply-side bus bar 185 through the fuse 183, and the load and the power supply are electrically connected.

Next, when the plug 188 is pulled out from the mounting portion 187 from the above state, the grasping plate 219 is grasped and pulled upward. If the plug 188 is pulled upward, the contact tops 228, 228 of the terminal member 215 slide on the terminal 182 of the fuse 183 and the terminal 186*a* of the load-side bus bar 186, and if the plug 188 is further pulled upward, the plug 188 is detached from the mounting portion 187. If the plug 188 is detached from the mounting portion 187, since the terminal member 216 is separated from the terminals 182 and 186*a*, the terminals 182 and 186*a* are electrically disconnected. With this, the load-side bus bar 186 and the terminal 182 of the fuse 183 are electrically disconnected, and the power supply and the load are electrically disconnected.

According to the present embodiment, since the terminal 182 of the fuse 183 and the terminal 186*a* of the load-side bus bar 186 located on the opposite surfaces of the insulation wall 189 are prevented from moving by means of the holding grooves 210 and 211 which are the wobble-suppressing means 190, when the terminal 215 is mounted astride the insulation wall 189, its insertion force is not varied.

Further, when the terminal member 215 is pulled out from the insulation wall 189, since the terminal 182 of the fuse 183 and the terminal 186*a* of the load-side bus bar 186 do not wobble, the terminal member 215 can easily be pulled out from the insulation wall 189. Therefore, excellent operability can be obtained.

Further, since the terminal 182 of the fuse 183 and the terminal 186*a* of the load-side bus bar 186 are located such as to sandwich the insulation wall 189, a reliably insulation state can be obtained by this insulation wall 189.

Further, since the terminal member 215 assembled into the plug 188 is mounted to the mounting portion 187, the terminal 182 of the fuse 183 and the terminal 186*a* of the load-side bus bar 186 are not unintentionally connected, and the insulation state can be secured sufficiently.

The load can be directly connected to the power supply by directly connecting the power supply-side terminal 185*b* of the power supply-side bus bar 185 to the power supply-side terminal. The power supply can be directly connected to the load by directly connecting the load-side terminal 186*b* of the load-side bus bar 186 to the load-side terminal. Therefore, wiring operation is unnecessary, and parts for wiring operation are unnecessary. Therefore, wiring operation is unnecessary, and parts for wiring operation are unnecessary.

Further, the fuse 183 accommodated in the fuse-accommodating box 184 is shielded from outside by the insulation cover 193 which closes the opening of the fuse-accommodating box 184. As a result, the fuse 183 can be protected from outside, the fuse 183 and terminals 181 and 182 thereof are protected against unintentional contact, and safety is enhanced.

What is claimed is:

1. A power supply shut-off apparatus, comprising:

a fuse having a pair of terminals, a fuse-accommodating box in which said fuse is accommodated, a power supply-side bus bar for connecting a power supply to one terminal of said pair of terminals of said fuse, said power supply-side bus bar having a terminal, a load-side bus bar for connecting a load to the other terminal of said pair of terminals of said fuse, said load-side bus bar having a terminal, a plug which is capable of being mounted to a mounting portion of said fuse-accommodating box and is capable of being separated from said mounting portion, thereby interrupting either the connection between said one terminal of said pair of terminals of said fuse and said terminal of said power supply-side bus bar or the connection between said other terminal of said pair of terminals of said fuse and said terminal of said load-side bus bar through said fuse, wherein:

said mounting portion is provided with an insulation wall, wherein either said terminal of said power supply-side bus bar or said terminal of said load-side bus bar is located on one surface side of said insulation wall, and wherein either one of said pair of terminals of said fuse is located on the other surface side of said insulation wall, said plug is formed of a plug housing and a terminal member having a U-shaped cross section, said terminal member being assembled into said plug housing and mounted astride said insulation wall for electrically connecting the terminal of said pair of terminals of said fuse located on said other surface side of said insulation wall to either said terminal of said power supply-side bus bar or said terminal of said load-side bus bar that is located on said one surface side of said insulation wall, and said insulation wall is provided with wobble-suppressing means for preventing each of the terminals that are located on either surface side of said insulation wall from moving from each respective surface side of said insulation wall and preventing these terminals from wobbling.

2. A power supply shut-off apparatus according to claim 1, wherein said wobble-suppressing means is a groove formed in said insulation wall into which a tip end of the terminal of said pair of terminals of said fuse located on said other surface side of said insulation wall and a tip end of either said terminal of said power supply-side bus bar or said terminal of said load-side bus bar is fitted.

3. A power supply shut-off apparatus according to claim 1, wherein an insulation flange is formed on an end of said insulation wall on an insertion side of said terminal member.

4. A power supply shut-off apparatus according to claim 1 further comprising an intermediate bus bar is provided between said other terminal of said pair of terminals of said fuse and said terminal of said load-side bar, wherein one end of said intermediate bus bar is connected to said other terminal of said pair of terminals of said fuse, and the other end of said intermediate bus bar is located on one surface side of said insulation wall.

5. A power supply shut-off apparatus according to claim 1, wherein said power supply-side bus bar and said power supply are connected, and said load-side bus bar and said load are connected through said power supply.

6. A power supply shut-off apparatus according to claim 1, wherein an electric shock preventing wall is provided around said insulation wall.

7. A power supply shut-off apparatus according to claim 1, wherein said plug is mounted to said mounting portion in a direction along a longitudinal direction of said fuse.

8. A power supply shut-off apparatus according to claim 1, wherein said plug is mounted to said mounting portion in a direction intersecting a longitudinal direction of said fuse.

9. A power supply shut-off apparatus according to claim 1, wherein said terminal of said power supply-side bus bar is directly connected to said one terminal of said pair of terminals of said fuse on the side of said power supply, and said terminal of said load-side bus bar is directly connected to said other terminal of said pair of terminals of said fuse on the side of said load.

10. A power supply shut-off apparatus according to claim 1, further comprising an insulation cover for closing an opening of said fuse-accommodating box.

* * * * *